US006825625B1

(12) United States Patent
Karwath et al.

(10) Patent No.: US 6,825,625 B1
(45) Date of Patent: Nov. 30, 2004

(54) DEVICE WITH AN ELECTROMOTOR

(75) Inventors: Arno Karwath, Rottweil (DE); Jörg Hornberger, Dornstetten (DE); Frank Jeske, St. Georgen (DE); Hermann Rappenecker, Vöhrenbach (DE); Hansjörg Kaltenbrunner, VS-Pfaffenweiler (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/719,440
(22) PCT Filed: Jun. 10, 1999
(86) PCT No.: PCT/EP99/03992
§ 371 (c)(1), (2), (4) Date: Dec. 12, 2000
(87) PCT Pub. No.: WO99/66633
PCT Pub. Date: Dec. 23, 1999

(30) Foreign Application Priority Data

Jun. 13, 1998 (DE) .......................... 198 26 458

(51) Int. Cl.$^7$ ............................... H02P 7/00
(52) U.S. Cl. ................. 318/434; 318/254; 318/138; 318/439; 388/900; 388/903; 388/904
(58) Field of Search ................ 318/254, 138, 318/439, 434; 388/900, 903, 904, 907.5, 916

(56) References Cited

U.S. PATENT DOCUMENTS

| 3,873,897 A | 3/1975 | Müller et al. |
| 4,030,363 A | 6/1977 | Halleck .................. 73/362 AR |
| 4,506,312 A | 3/1985 | Chan et al. .................. 361/240 |

(List continued on next page.)

FOREIGN PATENT DOCUMENTS

| DE | 24 17 659 | 10/1975 |
| DE | 36 07 014 | 9/1986 |
| DE | 37 02 947 | 8/1988 |

(List continued on next page.)

OTHER PUBLICATIONS

BROD, Günter: "Nichts bleibt verborgen," In: *drive & Control* 2–3/93, S.10, S.11.
Fichtner, Helmut: "Antrieb mit Elgeninitiative," In: *Industrie–Elektrik Electronik*, 35. Jg. 1990, Nr. 1, S. 50,51.
Schiftner, K.: "Antriebssysteme für die Traktion," In: *ELIN–Zeitschrift* 1990, H. 1/2, S. 7–20.
Achenbach, Joachim, "Hat sich gemausert," In *Elektrotechnik*. vol. 73, No. 1/2, pp 28–38 (Feb. 15, 1991).
Peltola, Mauri, et al.: "ACS 600–Antriebe mit direkter Drehmomentregelung," In: *ABB Technik* Jun. 1997, S. 31–39.
Gedeon, George et al., "Mikrocomputer steuert Antrieb für Intercity Express," in: *Energie & Automation*, vol. 11, No. 1, pp. 22–23, (1989).

(List continued on next page.)

*Primary Examiner*—Rita Leykin
(74) *Attorney, Agent, or Firm*—Milton Oliver; Ware Fressola Van Der Sluys & Adolphson LLP

(57) ABSTRACT

An arrangement having an electric motor (10) has a microcontroller (12) for influencing at least one motor function and a nonvolatile storage element (14) for storing at least one variable as a definition for that motor function. The arrangement also has an interface (13a) for a data line (13) for transferring the at least one variable, in particular a current limiting value ($I_{ref}$) from or to a storage element (14) by way of the microcontroller (12), and optionally by way of an internal data bus (15). The invention also relates to use of the device in the context of batteries of fans, and program-controlled current limitation for startup of an electric motor (10).

19 Claims, 19 Drawing Sheets

U.S. PATENT DOCUMENTS

| | | | |
|---|---|---|---|
| 4,528,486 A | | 7/1985 | Flaig et al. .................. 318/254 |
| 4,626,750 A | | 12/1986 | Post ............................ 318/139 |
| 4,628,235 A | | 12/1986 | Goings ........................ 318/430 |
| 4,636,936 A | | 1/1987 | Boyd, Jr. et al. ............ 364/148 |
| 4,736,347 A | * | 4/1988 | Goldberg et al. ............. 367/46 |
| 4,743,815 A | | 5/1988 | Gee et al. ..................... 318/254 |
| 4,831,380 A | | 5/1989 | Gimblett ...................... 341/166 |
| 4,831,509 A | | 5/1989 | Jones et al. ............. 364/167.01 |
| 4,833,628 A | | 5/1989 | Curran, Jr. ................... 364/550 |
| 4,893,067 A | | 1/1990 | Bhagwat et al. ............. 388/817 |
| 4,949,624 A | | 8/1990 | Hara et al. .................... 98/2.01 |
| 4,958,269 A | | 9/1990 | Gritter ......................... 364/153 |
| 4,959,797 A | | 9/1990 | McIntosh .................... 364/508 |
| 5,075,608 A | * | 12/1991 | Erdman et al. ............. 318/138 |
| 5,087,994 A | * | 2/1992 | Fukushima .............. 360/73.03 |
| 5,189,350 A | | 2/1993 | Mallett ........................ 318/434 |
| 5,206,572 A | | 4/1993 | Farag et al. ................. 318/778 |
| 5,268,623 A | | 12/1993 | Müller ........................ 318/434 |
| 5,275,012 A | | 1/1994 | Dage et al. ................... 62/208 |
| 5,317,245 A | | 5/1994 | Moritz et al. ................ 318/254 |
| 5,319,787 A | | 6/1994 | Shima et al. ................ 395/800 |
| 5,331,258 A | | 7/1994 | Lankin et al. ............... 318/139 |
| 5,410,229 A | | 4/1995 | Sebastian et al. ........... 318/434 |
| 5,448,442 A | | 9/1995 | Farag .......................... 361/24 |
| 5,455,934 A | | 10/1995 | Holland et al. .............. 395/404 |
| 5,473,229 A | * | 12/1995 | Archer et al. ............... 318/254 |
| 5,486,747 A | | 1/1996 | Welch ......................... 318/811 |
| 5,492,273 A | | 2/1996 | Shah ........................ 236/44 A |
| 5,537,015 A | | 7/1996 | Karwath ...................... 318/439 |
| 5,557,182 A | * | 9/1996 | Hollenbeck et al. ......... 318/138 |
| 5,590,235 A | | 12/1996 | Rappenecker et al. ....... 388/803 |
| 5,592,058 A | * | 1/1997 | Archer et al. ............... 318/254 |
| 5,616,269 A | * | 4/1997 | Fowler et al. ............... 219/720 |
| 5,632,156 A | | 5/1997 | Takeo et al. ................ 62/228.4 |
| 5,659,301 A | | 8/1997 | Berney ..................... 340/870.3 |
| 5,717,297 A | | 2/1998 | Karwath et al. ............. 318/254 |
| 5,744,921 A | * | 4/1998 | Makaran ..................... 318/254 |
| 5,744,926 A | | 4/1998 | Lai et al. ..................... 318/590 |
| 5,845,045 A | | 12/1998 | Jeske et al. .................. 388/804 |
| 5,847,523 A | | 12/1998 | Rappenecker et al. ....... 318/434 |
| 5,903,462 A | | 5/1999 | Wagner et al. ............. 364/474.1 |
| 6,037,732 A | | 3/2000 | Alfano et al. ................ 318/471 |
| 6,091,887 A | | 7/2000 | Dieterle et al. .............. 388/811 |
| 6,150,782 A | | 11/2000 | Breitling et al. ............. 318/434 |
| 6,188,602 B1 | | 2/2001 | Alexander et al. ...... 365/185.04 |
| 6,249,885 B1 | | 6/2001 | Johnson et al. ............... 714/47 |
| 6,318,965 B1 | | 11/2001 | Nair .............................. 417/2 |

FOREIGN PATENT DOCUMENTS

| | | |
|---|---|---|
| DE | 38 34 259 | 6/1990 |
| DE | 41 17 815 | 12/1992 |
| DE | 41 30 040 A1 | 3/1993 |
| DE | 42 31 347 C1 | 10/1993 |
| DE | 42 19 775 | 11/1993 |
| DE | 43 40 769 A1 | 6/1995 |
| DE | 195 13 528 A1 | 10/1996 |
| DE | 196 47 983 A1 | 6/1997 |
| DE | 197 05 543 A1 | 8/1998 |
| DE | 197 16 520 A1 | 11/1998 |
| DE | 197 44 729 | 4/1999 |
| EP | 0 088 62 A2 | 9/1983 |
| EP | 0 186 850 | 7/1986 |
| EP | 0 347 702 A1 | 12/1989 |
| GB | 2 215 148 | 9/1989 |
| GB | 2 259 618 A | 3/1993 |
| WO | WO 90-14636 | 11/1990 |
| WO | WO 97-15111 | 4/1997 |
| WO | WO 98-37493 | 8/1998 |

OTHER PUBLICATIONS

AWC Incorporated, "Siemens Variable Frequency Drives," retrieved Nov. 6, 2001 from www.AWC–CORP.COM/PRODUTS/Siemens_VFDs.html.

W. Böke/Siemens, "Drehstrom–Asynchronmotoren sanft started und Anläufe praxisnah simulieren," [How to simulate soft–start and running of DC asynchronous motors] in Maschinenmarkt, Würzburg, Germany 103 (1997), pp. 48–53.

Derwent WPI English abstract of DE 195 18 991–A1, Dieterle+/Papst, publ. Jan. 23, 1997.

Derwent WPI English abstract of DE 296 06 939–U1, Lukenich+/Papst, publ. Aug. 22, 1996.

National Semiconductor Corp., "COP840CJ 8–bit Microcontrollers with Multi–Input Wake–Up and Brown Out Detector," Jan. 2000, datasheet pp. 1–36.

* cited by examiner

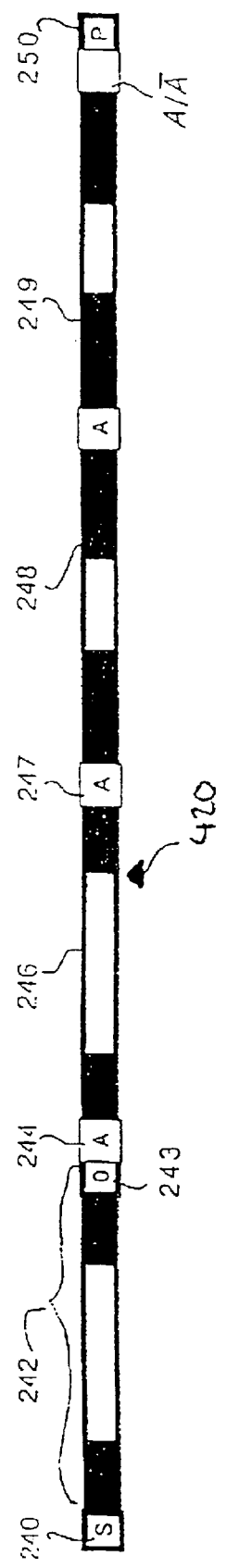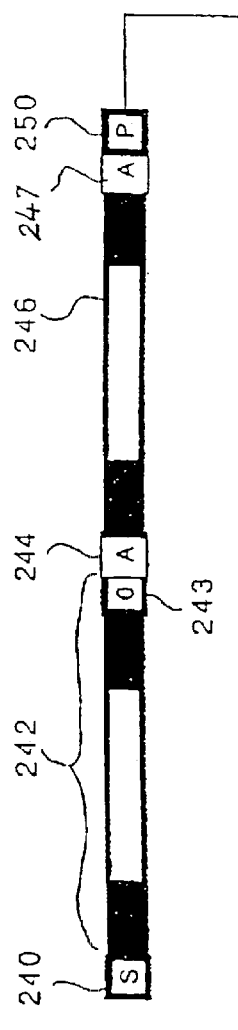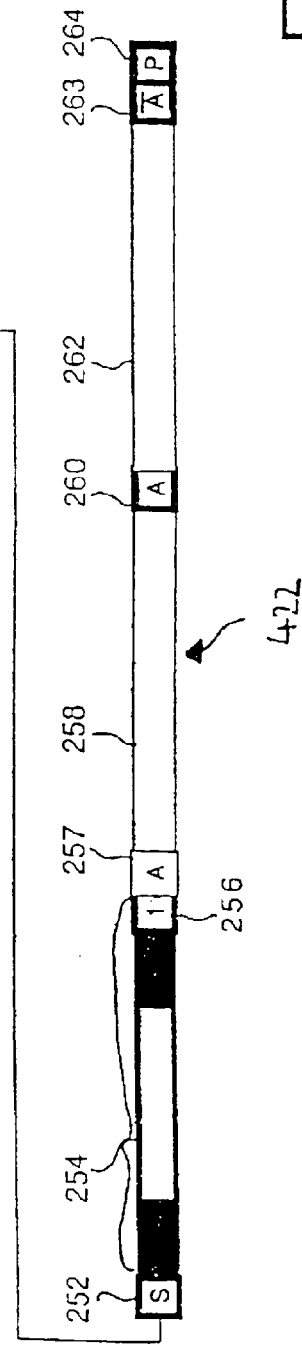
Fig. 17
Fig. 18

| Object Address 282 | Object name 284 | Number of bytes 286 | Memory type 288 | Hardware address 290 |
|---|---|---|---|---|
| ~~AA~~ | ~~BB~~ | ~~CC~~ | ~~DD~~ | ~~EE~~ |
| 01 | B1 | 1 | EEPROM | 0x00 |
| 02 | B2 | 1 | RAM | 0x00 |
| 03 | B3 | 2 | EEPROM | 0x01 |
| 04 | B4 | 2 | RAM | 0x01 |
| ... | ... | ... | ... | ... |
| 32 | ~~B32~~ | 1 | ROM | 0x00 |
| 33 | ~~B33~~ | 1 | ROM | 0x01 |
| ... | ... | ... | ... | ... |

Object Address 280

Row labels (annotations): Control word init, Status word, Setpoint speed, Actual speed, Manufacturer, SW version

Fig. 19

DEVICE WITH AN ELECTROMOTOR

FIELD OF THE INVENTION

The invention concerns an arrangement having an electric motor, and in particular having an electronically commutated motor (ECM).

BACKGROUND

Examples of such motors are shown, for example, in the following documents [of the Applicant] assigned to the assignee of the present application:

| | |
|---|---|
| DE 44 41 372 A1 = | 5,845,045 JESKE |
| EP 0 658 973 B1 = | 5,590,235 JESKE |
| DE 296 06 939.6-U = | EP 0 739 084 A2 |
| DE 195 15 944 A1 | |
| EP 0 741 449 A1 = | 6,163,117 |
| EP 0 744 807 B1 = | 5,847,523 |
| DE 195 18 991 A1 | |
| DE 196 47 983 A1 = | 6,091,887 |
| EP 0 780 962 A2 | |

It would not be possible to reproduce the extensive content of these documents even in summarized form, and reference is therefore made to their complete contents.

SUMMARY OF THE INVENTION

It is an object of the invention to make available a new arrangement and a new method for controlling an electric motor.

According to the invention, this object is achieved by connecting an output signal of a microprocessor, which can take on either a high level or a low level, to a voltage divider which regulates motor current, and varying the microprocessor output signal to achieve a desired motor current characteristic curve. [the subject matter of claim 1]. It is possible thereby, in program-controlled fashion, either to extend acceleration (called a "soft start") or to make acceleration as short as possible by raising the operating point for the current control system during the acceleration period so that the motor current can be higher during acceleration than later in normal operation.

A preferred method is to set a motor current limit to a first value for motor startup, to monitor the startup, and to reset the motor current limit to a second value after startup. [the subject matter of claim 11]. This method can be flexibly adapted to the needs of a user, since the limiting values can be adjusted in program-controlled fashion.

Another manner of achieving the stated object is the subject matter of claim 23. In this fashion, it is easily possible to adapt this kind of arrangement having an electric motor to the needs of its user by entering the desired values via the interface into the nonvolatile memory element of the arrangement (or reading it out from said memory element). This applies in principle to all motor values, e.g. rotation speed, current limiting values, temperature, acceleration time, torque at rest, and others. The storage operation can be accomplished at the factory or at a later point in time in order to adapt the motor optimally to a customer's needs. This is particularly advantageous for motors that drive a fan, since with such fans the needs of users can be very different, and a fan arrangement of this kind can very easily be optimized for a user's needs, as depicted for example in FIG. 22.

Further details and advantageous developments of the invention are evident from the exemplary embodiments described below and depicted in the drawings (and to be understood in no way as a limitation of the invention).

BRIEF FIGURE DESCRIPTION

FIG. 17 shows an example of an instruction and data word used to write an object over the serial bus;

FIG. 18 shows an example of an instruction and data word used to read an object over the serial bus;

FIG. 19 shows an example of an object table permanently stored in the device;

Figure 22:
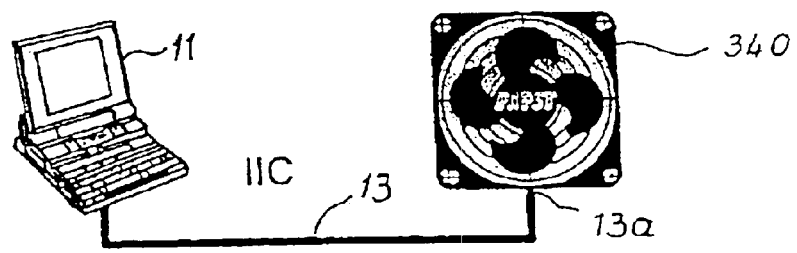
Figure 23:
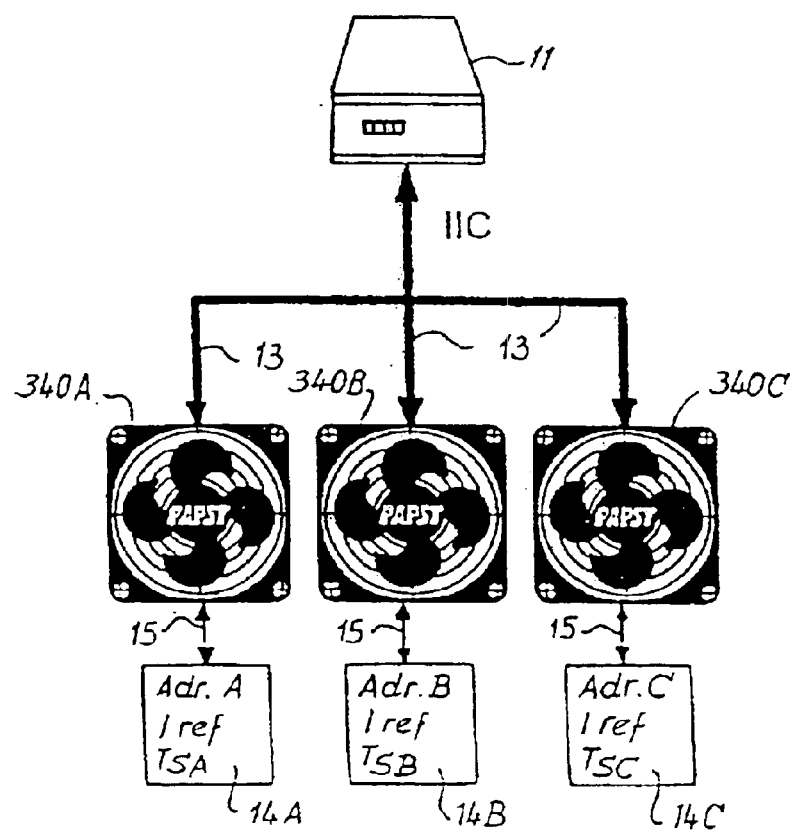
Figure 24:
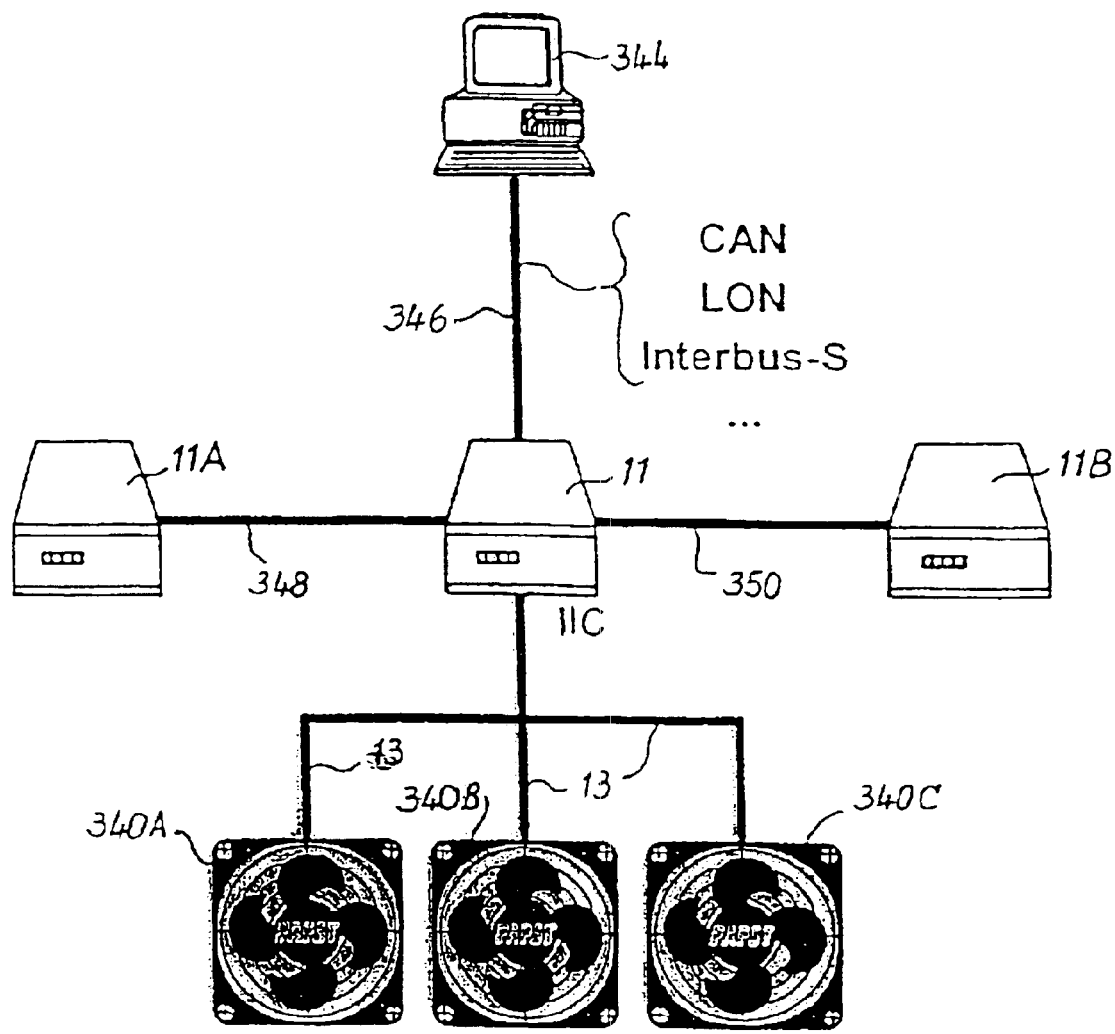

FIG. 22 is an overview showing how a fan 340 is connected via a bus 13 to a laptop 11 in order to program fan 340 in accordance with the requirements of an application;

FIG. 23 shows a battery of fans with three fans, and how they are controlled by a shared central unit 11 via a serial bus 13; and FIG. 24 is a view similar to FIG. 23, showing how central unit 11 can be connected via a higher-performance bus 346 to a server 344, in order to construct a more extensive bus system.

DETAILED DESCRIPTION

Figure 1:
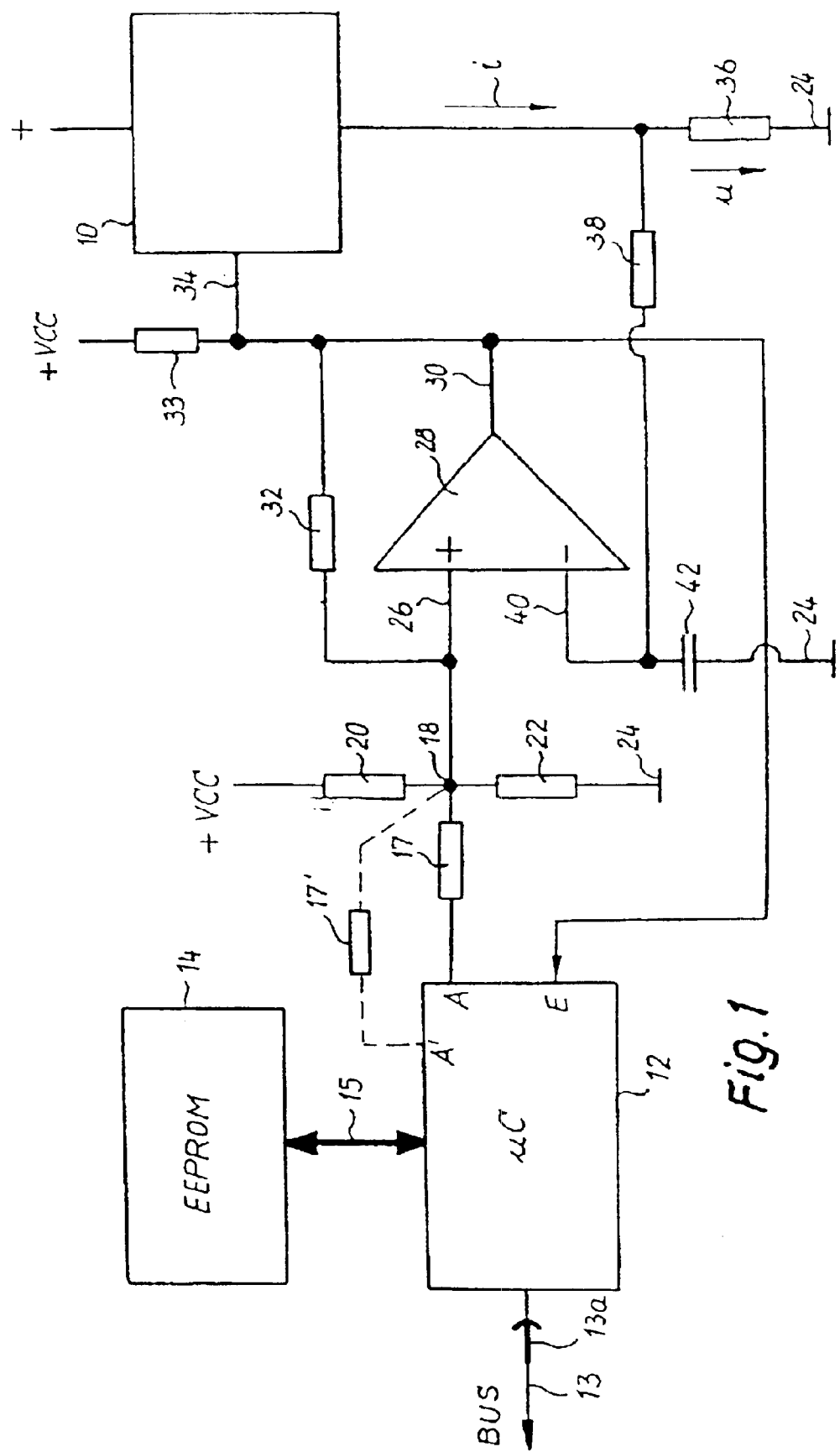
FIG. 1 is a schematic circuit diagram of an arrangement according to the present invention.

FIG. 1 illustrates a first embodiment of an arrangement according to the present invention with which, in the context of an electric motor 10, current limiting with variable current limiting values $I_{ref}$ is possible in program-controlled fashion.

The arrangement has a microcontroller 12 that communicates, optionally via a bus interface 13a and an external bidirectional bus 13 that can be connected thereto, with a computer 11 (FIG. 12) or another motor. What can be used here is, for example, a (serial) I²C bus, or any other known type of serial or parallel bus. (Regarding the I²C bus, cf. for example Philips, IIC Peripherals, IC12 [Philips Semiconductors company document, 1995].)

Connected to microcontroller 12, also via an (internal) I²C bus 15, is a serial EEPROM 14, i.e. a nonvolatile memory, in which data for the operation of motor 10 are stored; these can be modified from outside via bus 13, data traffic to and from EEPROM 14 being controlled by microcontroller 12, which additionally controls functions of motor 10, e.g. commutation thereof, as will be described below with reference to FIG. 11. Microcontroller 12 thus has the function of a master in relation to internal bus 15, i.e. it controls transfers thereon; whereas in relation to external bus 13 it has the function of a slave, i.e. data transfer on external bus 13 is controlled by an external device 11, e.g. by an ordinary desktop computer, a laptop, or a special device (cf. FIG. 12 or 20).

Alternatively, it is also possible to use a microcontroller or microprocessor having an integrated EEPROM, which simplifies programming. Such microcontrollers are available commercially.

Microcontroller 12 has an output A that can assume three switching states, as explained in detail below with reference to FIGS. 2 through 4. Connected to output A via a high-resistance resistor 17 is a node 18 that is connected via a resistor 20 to a regulated positive voltage Vcc, e.g. +5 V, and via a resistor 22 to ground 24.

Node 18 is connected to positive input 26 of a comparator 28 whose output 30 is connected via a resistor 32 (to establish the switching hysteresis) to input 26, also to an input E of microcontroller 12 and, via a resistor 33, to potential Vcc. Output 30 is also connected to an input 34 of motor arrangement 10 (FIGS. 6 and 9 below show two examples of a motor arrangement of this kind). A low signal at input 34 causes energy delivery to motor arrangement 10 to be interrupted.

Motor arrangement 10 is in series with a low-resistance measurement resistor 36 whose one terminal is connected to ground 24. Motor current i results in a voltage u at resistor 36 which is conveyed via a resistor 38 to negative input 40 of comparator 28. Input 40 is connected via a capacitor 42 to ground 24.

Resistor 38 forms, together with capacitor 42, a first-order low-pass filter that, together with feedback resistor 32, determines the current limiting frequency, e.g. 15 to 20 kHz. This frequency is preferably above the highest frequency that can be perceived by the human ear.

Typical Component Values

Figure 10:
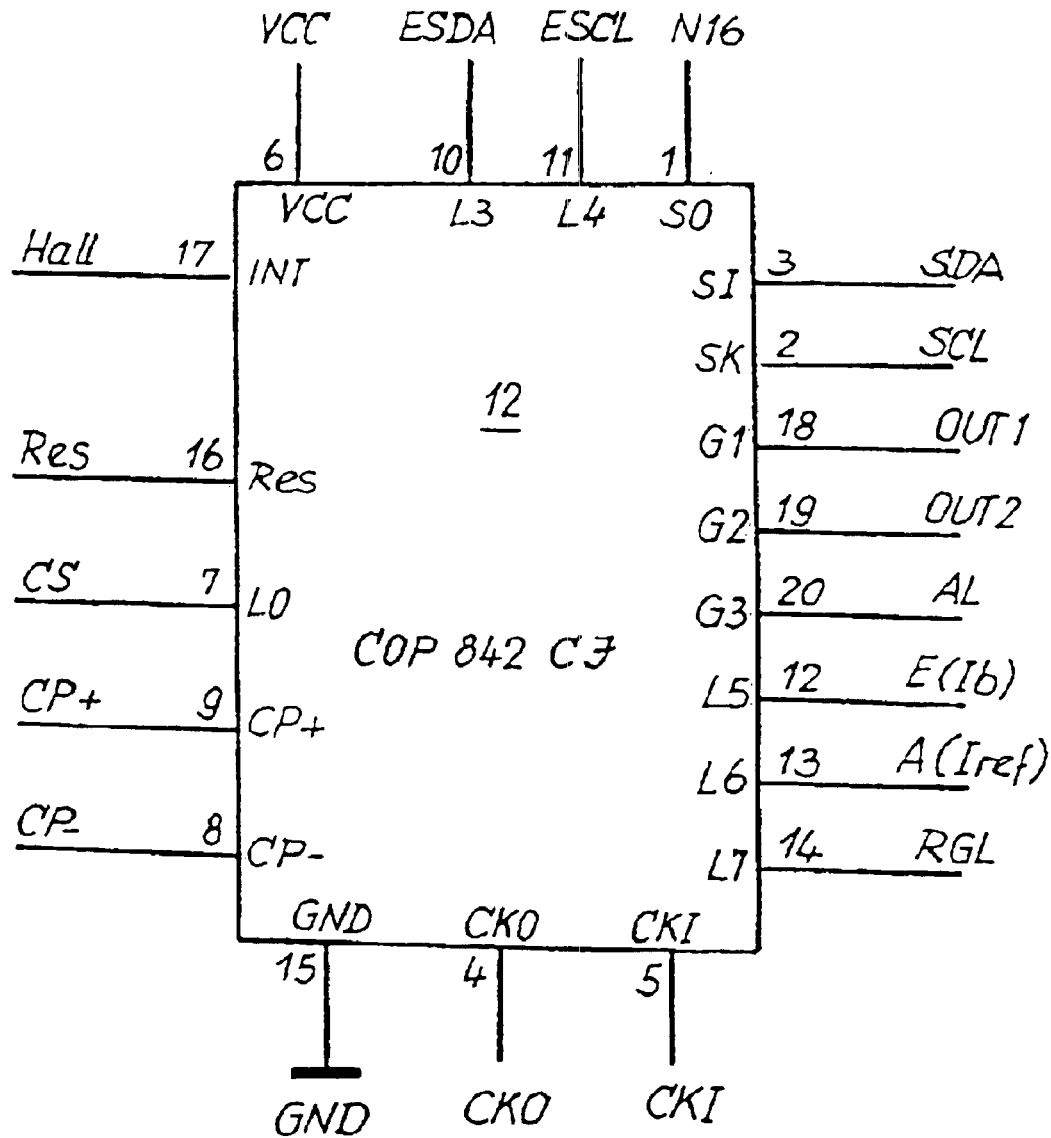
FIG. 10 shows the terminal markings of the COP 842 CJ microcontroller.

Microcontroller 12 COP 842 CJ (National Semiconductor) (FIG. 10 shows, by way of example, the manufacturer's terminal markings 1 through 20 of this microcontroller 12, as well as the port designations used by the Applicant, e.g. OUT1, OUT2, etc.)

| EEPROM 14 | two-wire serial CMOS EEPROM AT24C01A (ATMEL) |
|---|---|
| Resistor 22 | 47 k ohms |
| Resistors 17, 20, 33 | 100 k ohms |

-continued

| EEPROM 14 | two-wire serial CMOS EEPROM AT24C01A (ATMEL) |
|---|---|
| Resistor 32 | 1 M ohms |
| Resistor 36 | 1 ohm |
| Resistor 38 | 1 k ohms |
| Capacitor 42 | 22 nF |
| Capacitor 45 | 33 nF |
| Comparator 28 | LM2901 |

Mode of Operation

It will initially be assumed, for explanation purposes only, that resistor 17 has a value of infinity (∞), so that the potential of output A has no effect on the potential of node 18, which in this instance is determined only by the ratio between resistors 20 and 22.

If current i in motor 10 rises, voltage u at measurement resistor 36 also rises; and if it exceeds the potential at positive input 26 of comparator 28, the previously high output 30 of comparator 28 becomes low, causing the current in motor arrangement 10 to be interrupted.

This causes voltage u to drop; negative input 40 of comparator 28 again becomes more negative than positive input 26, so that output 30 of comparator 28 once again becomes high, and the current through motor arrangement 10 is switched back on.

If motor current i therefore becomes so great that comparator 28 switches over, motor current i is continuously switched off and on in the manner of a pulse-width modulation (PWM) system, causing motor current i to be limited to a predefined value $I_{ref}$ that is defined by the potential at node 18.

Output A of microcontroller 12 is preferably a so-called tristate output. FIG. 2 shows the state $I_{ref}=1$, in which output A is connected via an internal switch 44 (transistor) to positive voltage Vcc, which is filtered via a capacitor 45. This means that the high-resistance resistor 17 (100 kW) is connected in parallel with resistor 20 (100 kW), thus causing the potential at node 18 to become higher; in other words, in this case current limiting begins only at a higher value of motor current i. This state is desirable while a motor is starting up, since the motor current can in that context become very high for a short period, and current limiting should therefore begin only at higher current values in order to result in rapid acceleration of motor 10.

Figure 3:
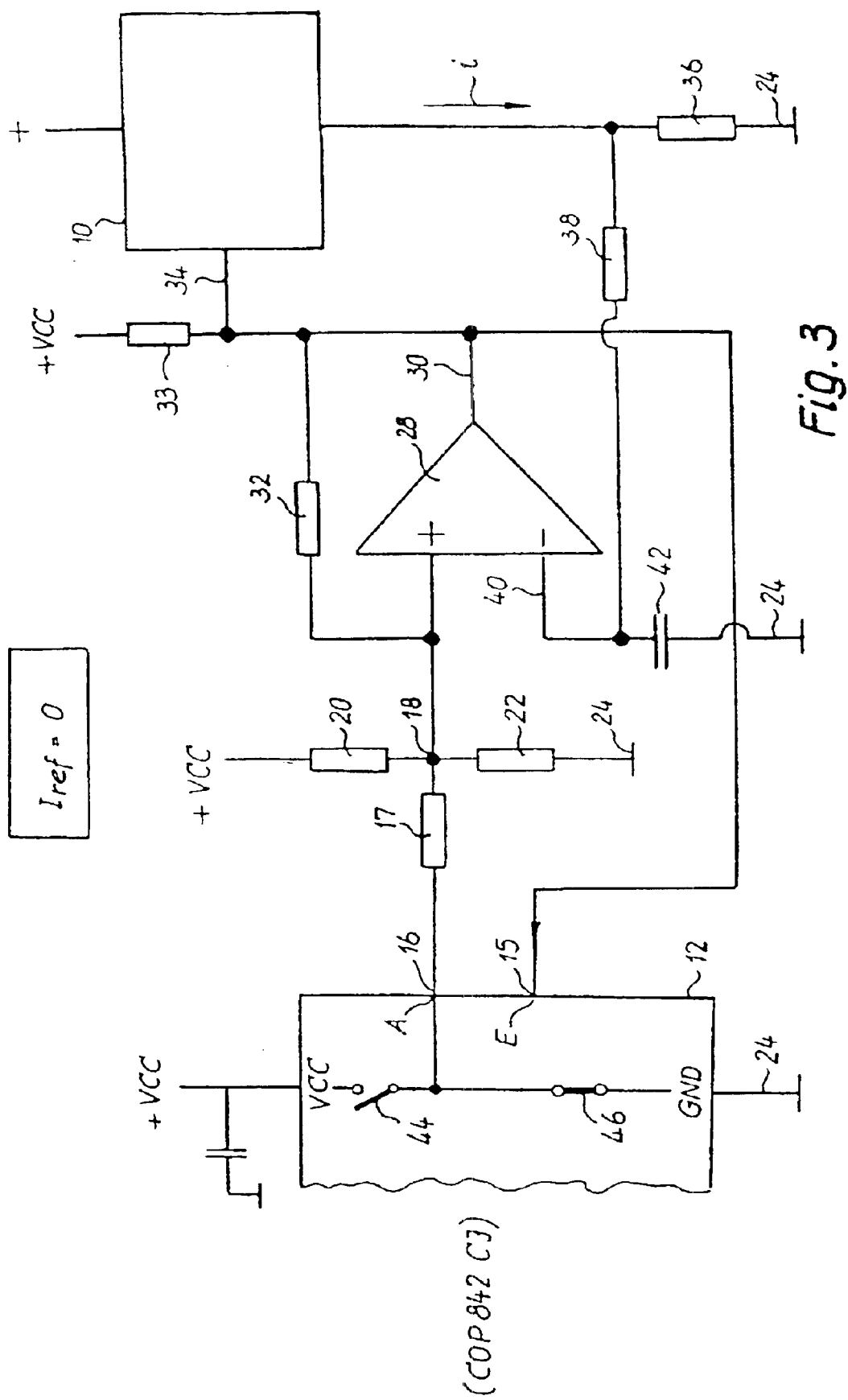

FIG. 3 shows the state $I_{ref}=0$, in which switch 44 (transistor) in microcontroller 12 is nonconductive, and instead a switch 46, which connects output A to ground 24, is conductive. This causes resistor 17 to be connected in parallel with resistor 22, so that the potential at node 18 becomes lower; in other words, in this case current limiting already begins when the current in motor 10 is lower. This state is desirable if motor 10 is being decelerated or jammed by mechanical influences, since the motor then cannot overheat due to electrical losses.

Figure 4:
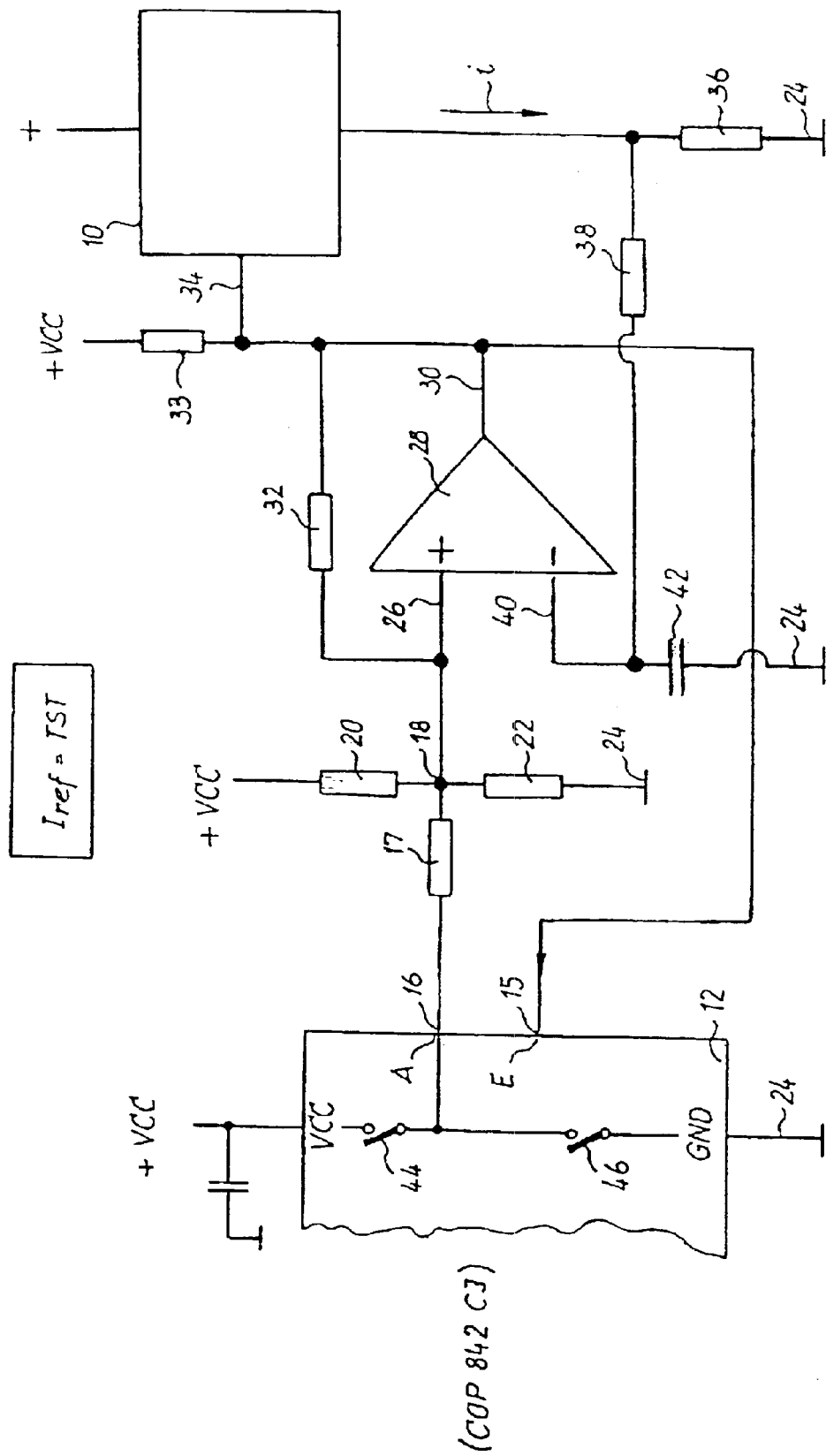

FIG. 4 shows the state $I_{ref}=TST$ (tristate). In this state both internal switches 44, 46 of microcontroller 12 are nonconductive, so that output A has a high resistance. In this instance resistor 17 has no influence on the potential of node 18, i.e. said potential is lower than when $I_{ref}=1$ and higher than when $I_{ref}=0$. This is a state that can be used for normal operation of motor 10.

Switches 44, 46 in microcontroller 12 are transistors that are controlled by the program of microcontroller 12, i.e. in this example the value $I_{ref}$ can be set, in program-controlled fashion, to three different values: 0, 1, or TST.

Figure 5:
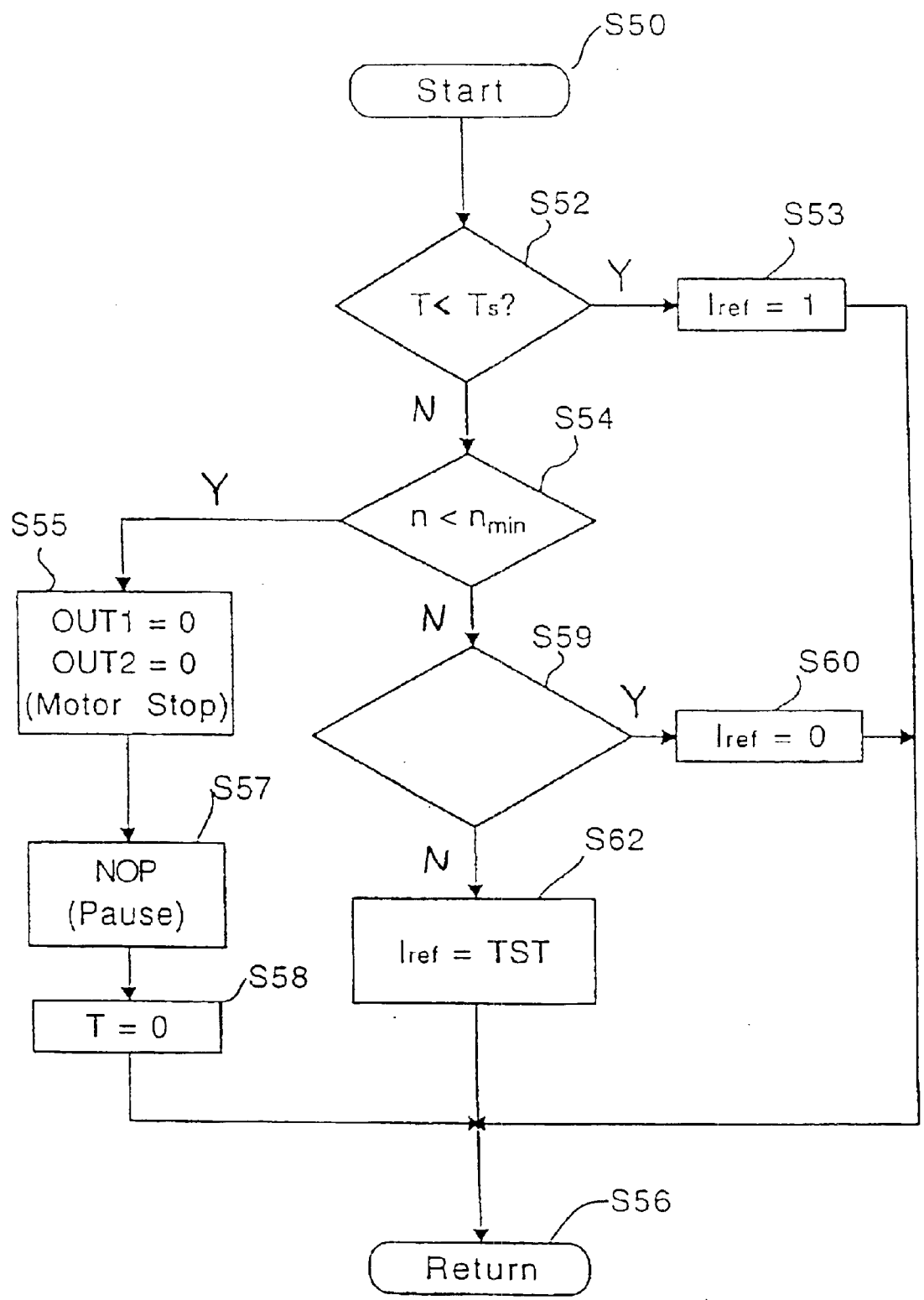
FIG. 5 is a flow chart to explain the mode of operation of the arrangement according to FIGS. 1 through 4.

FIG. 5 shows, by way of example, a typical program sequence. In step S50, motor 10 is initialized and started and begins its acceleration, the duration Ts of which is taken from EEPROM 14, e.g. 3 seconds. This value can be entered from outside into EEPROM 14 via bus 13, microcontroller 12, and bus 15. Upon initialization (step S50) this value, together with other values, is read out of EEPROM 14 into a RAM in microcontroller 14.

Step S52 monitors whether the motor is still within acceleration period Ts. If so, then in step S53 $I_{ref}$=1 is set, i.e. switch 44 is closed and switch 46 is opened. The program thereafter moves to step S56 (return) and begins another pass.

If it is found in step S52 that acceleration period Ts has expired, the program goes to step S54, which checks whether motor rotation speed n is below a predefined minimum rotation speed $n_{min}$. This can mean that the motor is jammed, or that it is running too slowly. If the answer in step S54 is Yes (Y), then in step S55 the motor is switched off, e.g. by setting the two signals OUT1 and OUT2 in FIG. 9 to zero. Rotation speed $n_{min}$ is taken from EEPROM 14 upon initialization; it can be modified via bus 13 by loading a different value for $n_{min}$ into EEPROM 14.

Step S57 then follows, in which the motor is de-energized for a waiting time of, for example, 5 seconds. In the subsequent step S58, the time T for acceleration (cf. S52) is reset to zero, and the program proceeds via step S56 (return) back to the start (S50) and attempts to restart the motor.

If the answer in step S54 is No (N), meaning the motor is operating at a speed n in the normal range, the program then goes to step S59. In this, the program continually checks whether current limiting signals were present at input E during the entire duration of the previous second (cf. FIG. 7), i.e. whether the current-limiting function was active during the previous second. If so, the program goes to step S60 which sets $I_{ref}$=0, i.e. motor current i is, from now on, limited to a lower value so that motor 10 is not excessively heated by the motor current. The program then goes to step S56 (return).

If no current-limiting activity is ascertained in step S59, the program goes to step S62, where $I_{ref}$=TST is set, i.e. the current limiting function is set to a value suitable for normal operation (tristate; cf. FIG. 4).

Figure 6:
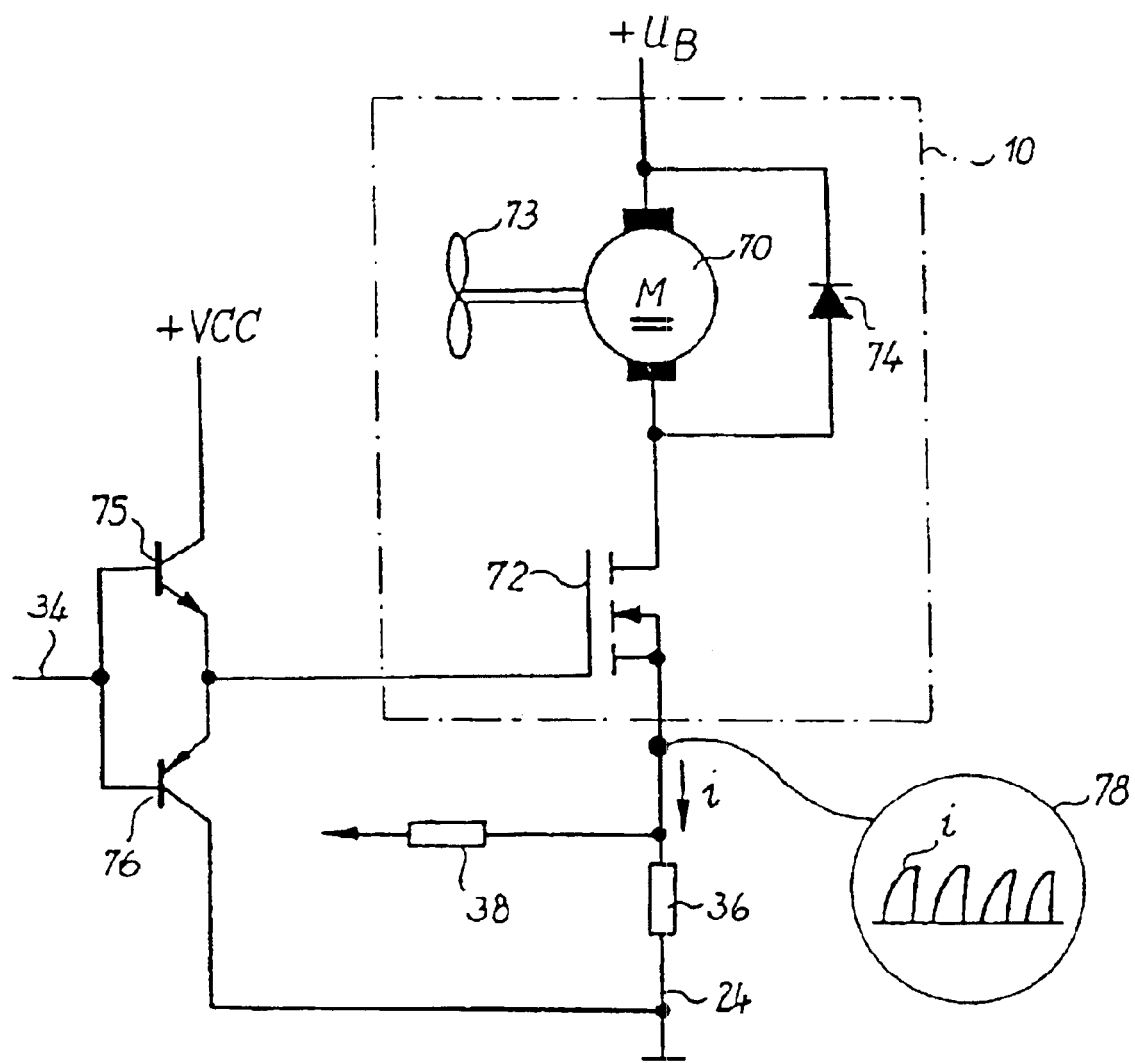
FIG. 6 shows an exemplary embodiment of a motor arrangement that can be used in the arrangement shown in FIG. 1.

FIG. 6 shows a simple example of a motor arrangement 10, here having a DC collector motor 70 that is connected in series with a power MOSFET transistor 72 and drives, for example, a (symbolically indicated) fan 73. A free-wheeling diode is labeled 74 and is connected antiparallel with motor 70. Transistor 72 is controlled by an npn transistor 75 and a pnp transistor 76, whose emitters are connected to one another and to the gate of transistor 72. The collector of transistor 75 is connected to Vcc, and that of transistor 76 to ground 24. The bases of transistors 75 and 76 are connected to one another and to terminal 34 of FIG. 1 or 12.

If a low potential is present at input 34, transistor 75 is inhibited and transistor 76 becomes conductive, so that MOSFET 72 becomes nonconductive and interrupts power to motor 70.

If input 34 has a high potential, transistor 75 then becomes conductive and transistor 76 is inhibited, so that MOSFET 72 becomes conductive and a current i flows to motor 70, as depicted at 78. The depiction at 78 applies to the state in which current limiting is effective. The circuit shown in FIG. 6 has the advantage that motor voltage $U_B$ is independent of voltage VCC.

Figure 7:
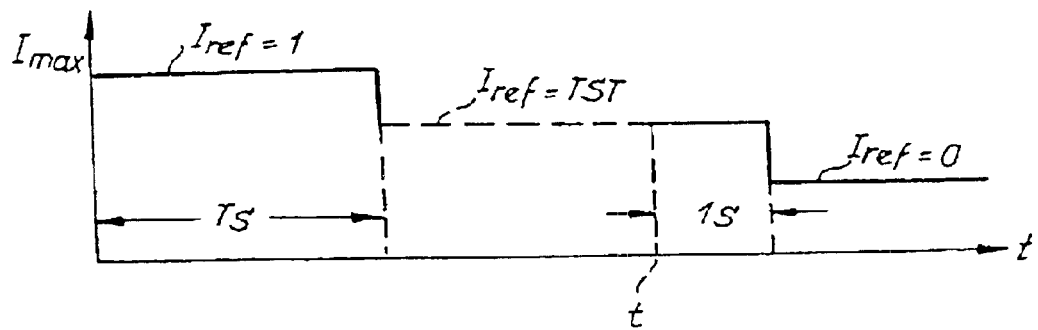
FIG. 7 is a view to explain FIG. 5.

FIG. 7 shows the high current limiting value $I_{ref}$=1 during the period $T_s$, and then the limiting value $I_{ref}$=TST in normal operation.

Motor 10 becomes jammed at time t, and one second later the current limiting function switches to $I_{ref}$=0 and thereby limits the current in the motor (under program control) to a low value.

Figure 8:
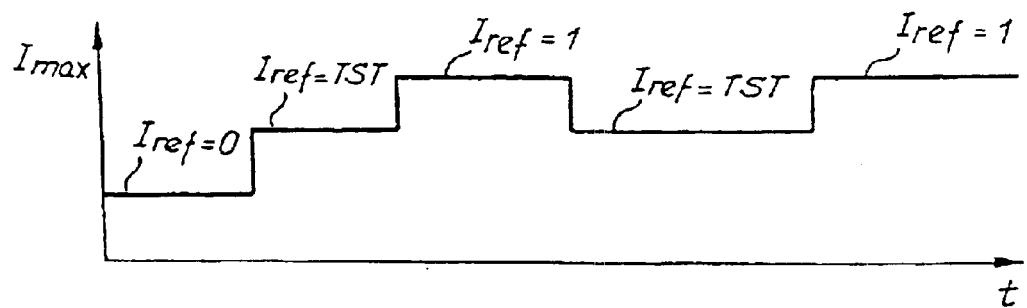
FIG. 8 is a further depiction to explain the invention.

FIG. 8 shows how the current limiting value $I_{ref}$ can be switched over, under program control by way of values in EEPROM 14, between its three values as a function of time. This makes it possible, as depicted in FIG. 8, to program a "soft start", i.e. one at low current.

If a microcontroller 12 having two tristate outputs A, A' is used, as indicated in FIG. 1, it is then possible to generate more current limiting values by also connecting output A' via a resistor 17" to node 18, resistor 17' usually having a resistance value different from that of resistor 17. The number of limiting values equals three to the power of the number of outputs; for example, with a microcontroller having two tristate outputs A, A', $3^2$=9 different limiting values; with three outputs A, A', and A", 27 different limiting values, etc.

It is a very advantageous feature of the invention that by way of bus 13 and EEPROM 14, any desired states and times for controlling the current limiting function can be defined for microcontroller 12. The data transferred via serial bus 13 are stored in EEPROM 14 and remain stored there, and available for subsequent motor operation, even after voltage Vcc has been switched off. As a result, it is possible to program a motor optimally for its particular operating task without needing to modify resistors or other electrical elements in said motor's circuitry.

Figure 9:
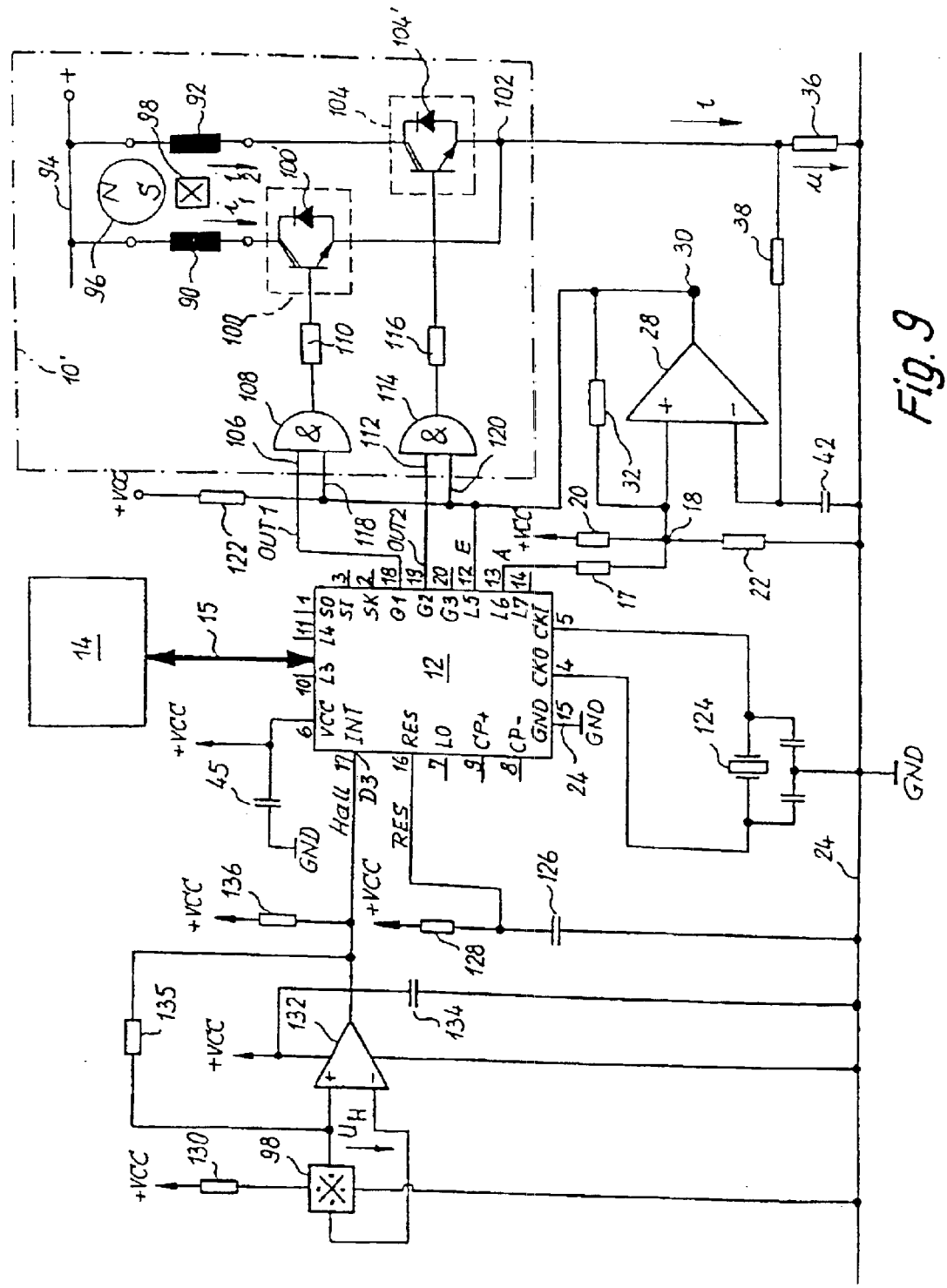
FIG. 9 shows an exemplary depiction of the invention in combination with an electronically commutated motor 10'.
Figure 13:
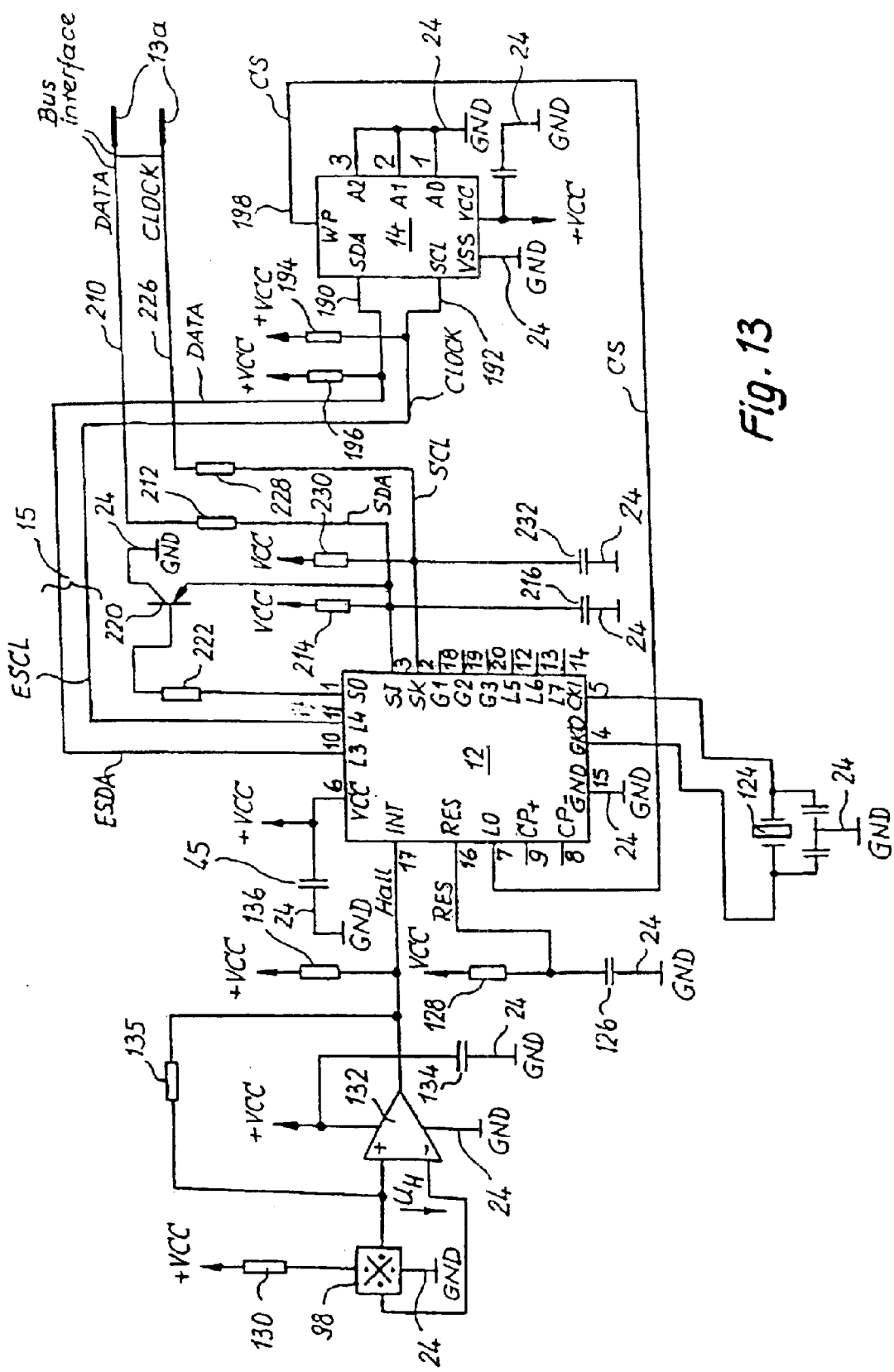
FIG. 13 is a circuit diagram analogous to FIG. 9, which shows the electrical connections of a nonvolatile memory and a serial data bus that serves to transfer electrical data into or out of said memory.

FIG. 9 shows, as a variant of FIG. 6, an embodiment having a collectorless DC motor 10' that is preferably used to drive fans. DE 23 46 380 C3 describes a typical example of the mechanical configuration of such motors. Parts that are identical or functionally identical to those in the previous Figures are labeled with the same reference characters as therein, and usually are not described again. External bus 13 and its interface 13a are not depicted in FIG. 9 but are shown in FIG. 13. EEPROM 14 and its bus 15 are only schematically indicated in FIG. 9 (see FIG. 13 for details).

Motor 10' has two winding phases 90, 92, each connected at one terminal to a positive lead 94 at, for example, 48 volts. A permanent magnet rotor is indicated symbolically at 96. When it rotates, it controls with its magnetic field a Hall generator 98 that is depicted once again on the extreme left of FIG. 9. Be it noted that the current limiting function can be used with any type of collectorless DC motor, i.e. not only with a two-phase motor but also with a motor having one phase, three phases, etc.

The other terminal of phase 90 is connected via an npn Darlington transistor 100 to a node 102, and the other terminal of phase 92 is connected via an npn Darlington transistor 104 to node 102. Current measurement resistor 36 that has already been described is located between node 102 and ground 24.

Free-wheeling diodes 100', 104' are located antiparallel to the two Darlington transistors 100, 104. When transistor 100 conducts, a current $i_1$ flows. When transistor 104 conducts, a current $i_2$ flows. Both currents are limited, by the current limiting arrangement already described, to a (variable) value $I_{ref}$.

Output G1 of microprocessor 12, whose terminals and terminal markings are depicted in detail in FIG. 10, leads to terminal 106 of an AND element 108 whose output is connected via a resistor 110 to the base of transistor 100.

Output G2 of microprocessor 12 leads to input 112 of an AND element 114 whose output is connected via a resistor 116 to the base of transistor 104.

The second input 118 of AND element 108 and the second input 120 of AND element 114 are connected via a resistor 122 (e.g. 100 kW) to positive voltage Vcc, and also to input E of microprocessor 12 and to output 30 of comparator 28.

When output 30 of comparator 28 is low, it inhibits both AND elements 108, 114 and thus prevents signal OUT1=1 (at port G1) from activating transistor 100, or signal OUT2=1 (at port G2) from activating transistor 104. When current limitation is engaged, therefore, the transistor 100 or 104 that is presently conductive is inhibited by the signal at output 30 of comparator 28, and that signal is analyzed in microprocessor 12 via input E (cf. step S58 of FIG. 5).

FIG. 9 shows at 124 a quartz oscillator that is connected to terminals CK0 and CK1 of microprocessor 12 and defines its clock frequency, for example 4 MHz. Reset input Res is connected via a capacitor 126 to ground 24, and via a resistor 128 to +Vcc. These two component generate a power-up reset at startup time, in the usual way.

Hall generator 98, for example of the type HW101A, is connected for power supply purposes via a resistor 130 (e.g. 3.3 k ohms) to +Vcc, and directly to ground 24. Its output signal $u_H$ is conveyed to the two inputs of a comparator 132 (e.g. LM2901D) whose Vcc input has associated with it a filter capacitor 134 of, for example, 33 nF. Its output is connected via a feedback resistor 135 (e.g. 100 k ohms) to the positive input, and via a so-called pull-up resistor 136 (e.g. 33 k ohms) to +Vcc, and directly to the INT port (FIG. 10) of microprocessor 12, resulting at the latter, during operation, in a HALL signal that is controlled by rotor magnet 96. This signal therefore always has the value HALL=0 during one rotor rotation of 180° el., and the value HALL=1 during the subsequent rotation of 180° el.

Figure 11:
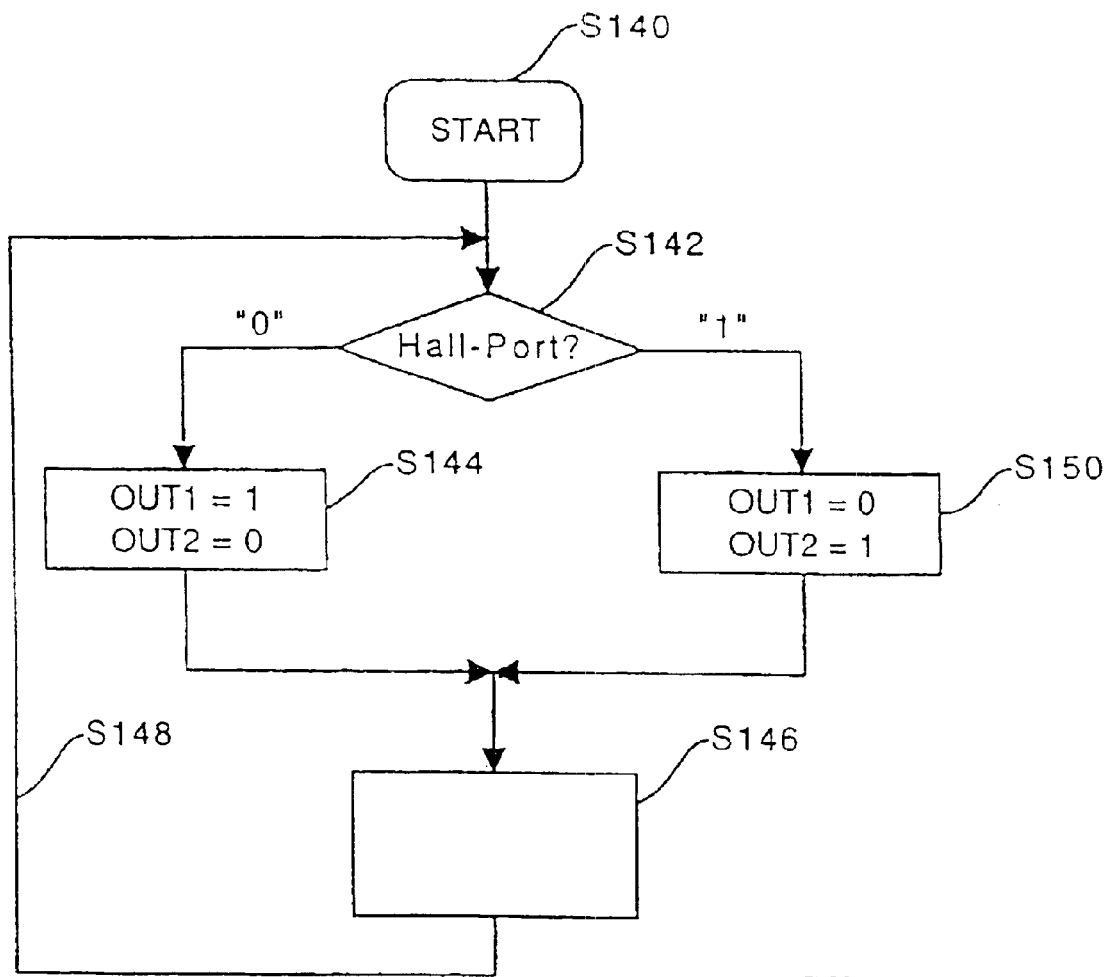
FIG. 11 shows a flow chart explaining FIG. 9.

FIG. 11 shows the manner in which motor 10' is commutated by microprocessor 12. At step S140, motor 10' is started, i.e. switched on, initialized with values from EEPROM 14, etc.

In step S142, the Hall port INT is interrogated. If the signal there equals "0", the program proceeds to step S144 and OUT1=1 and OUT2=0 are set, i.e. transistor 100 is switched on and transistor 104 is switched off, so that a current $i_1$ flows in winding phase 90. This state in step S144 is stored until a change in the HALL signal is detected.

The program then goes to step S146, where, for example, the routine according to FIG. 5 is executed, and the program then proceeds via loop S148 back to step S142.

If it is ascertained in S142 that HALL=1, the program then goes to step S150, where OUT1=0 (transistor 100 switched off) and OUT2=1 (transistor 104 switched on) are set, so that a current $i_2$ now flows through phase 92.

The result, when current limiting is engaged, is then that when the current i through measurement resistor 36 becomes too high, the particular transistor that is conductive (100 or 104) is inhibited.

By (internally) switching over output A of microcontroller 12, the current limiting value $I_{ref}$ can be switched over in program-controlled fashion to three different current limiting values $I_{ref}$, as already described in detail.

Figure 2:
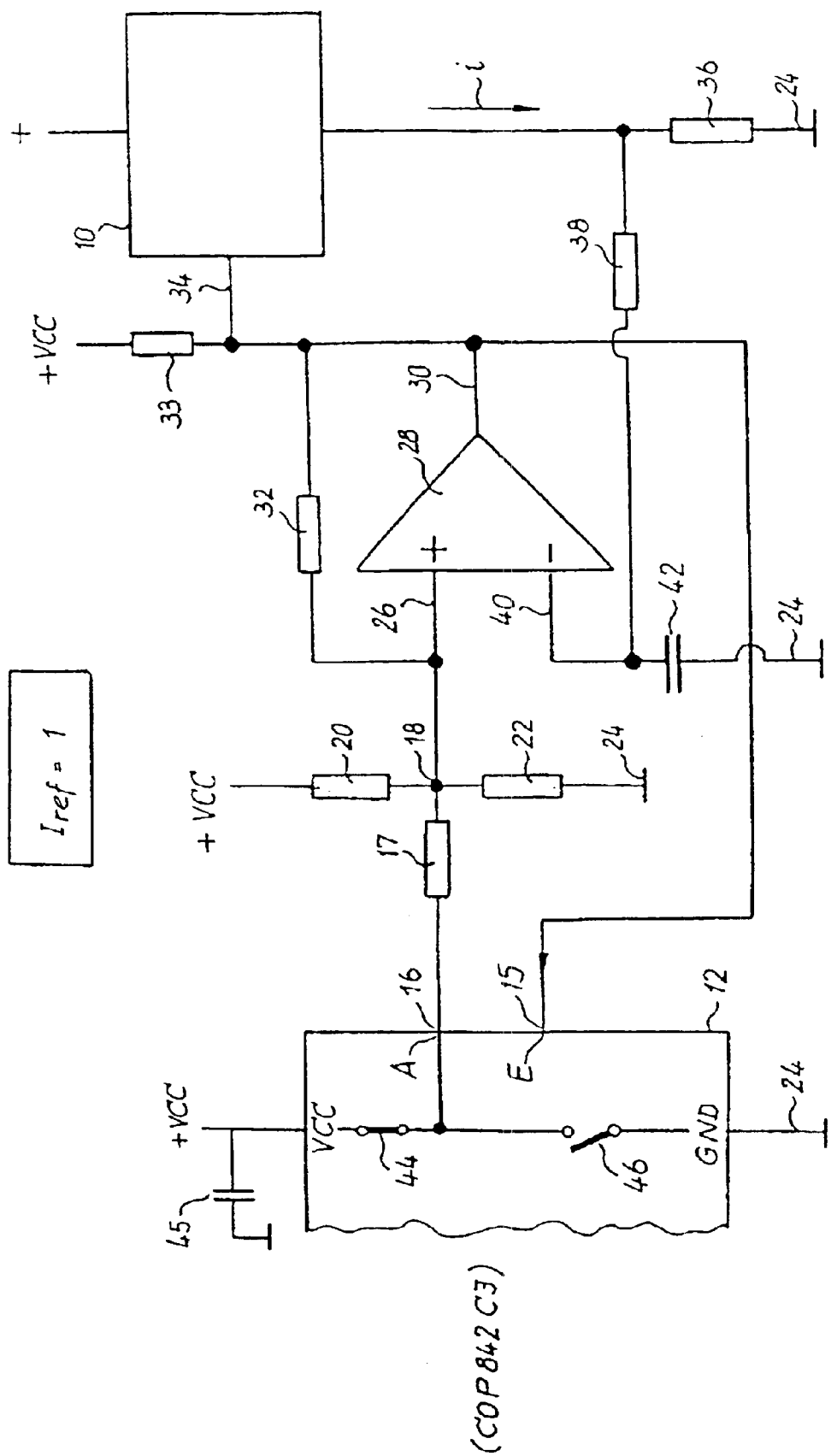
FIGS. 2–4 are circuit diagrams to explain FIG. 1.

If it is assumed that in FIGS. 1 through 4 the two resistors 17 and 20 have a value of 100 k ohms and resistor 22 a value of 47 k ohms, and that voltage Vcc is about +5 V, then node 18 has a potential of 2.5 V in FIG. 2, 1.6 V in FIG. 4, and 1.24 V in FIG. 3.

These are relatively high voltages, and measurement resistor 36 through which motor current i flows must also be correspondingly large so that voltage u at this resistor is greater than the aforesaid potentials (1.24, 1.6, or 2.5 V), and the current limiting function is thereby activated.

As a result, corresponding losses in resistor 36 always occur during operation; this is undesirable, since it reduces the efficiency of the motor. If, on the other hand, resistor 22 is made substantially smaller than resistor 20, this has only a very minor effect when, in the state shown in FIG. 3, the high-resistance resistor 17 is connected in parallel with the low-resistance resistor 17. (Resistor 17 must have a high resistance, since the currents through microcontroller 12 must not exceed a specific, very low value.)

Figure 12:
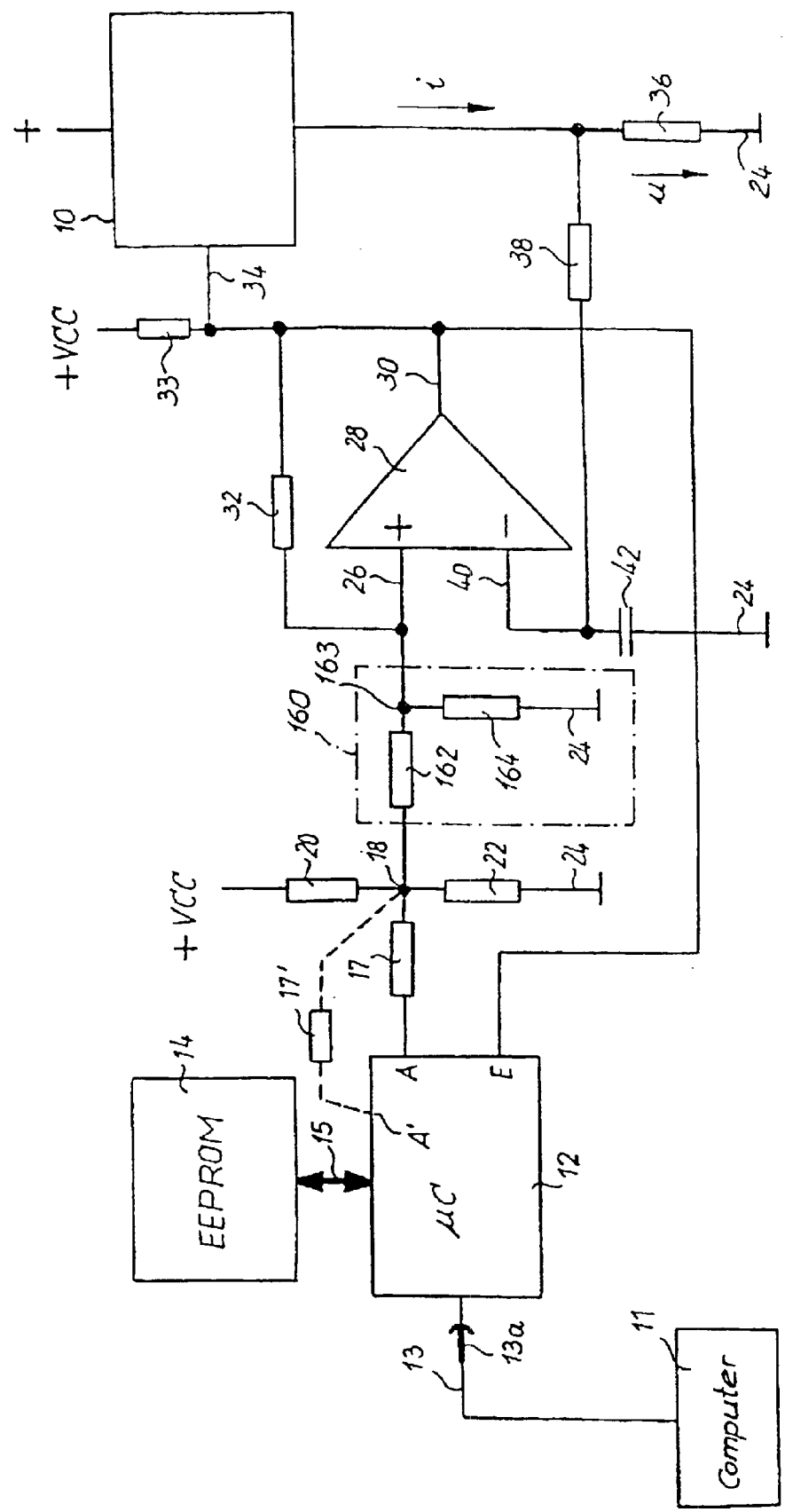
FIG. 12 shows a preferred variant of FIGS. 1 through 4 with an electronically commutated motor.

The circuit depicted in FIG. 12 offers some improvement here, since in it, the losses in measurement resistor 36 become smaller, i.e. measurement resistor 36 can be given a lower resistance value. Parts that are identical or functionally identical to those in the previous Figures are labeled in FIG. 12 with the same reference characters, and usually are not described again.

In this case node 18 is connected to positive input 26 of comparator 28 not directly, but via a second, high-resistance voltage divider 160. The latter contains a first resistor 162 between node 18 and positive input 26 of comparator 28, as well as a second resistor 164 between positive input 26 and ground 24. The tapping point of this second voltage divider 160 is labeled 163, and is connected directly to positive input 26. If, for example, resistor 162 is given a value of 1 M ohms, and resistor 164 a value of 100 k ohms, the potential at positive input 26 is then only approximately one-eleventh of the potential at node 18, and the value of measurement resistor 36 can therefore be reduced to approximately one-tenth of that in FIGS. 1 through 4; the same is true of the losses at that resistor, correspondingly improving the motor's efficiency. Since resistors 162, 164 together have, for example, a value of 1.1 M ohms, while resistor 22 has a value, for example, of only 47 k ohms, voltage divider 160 has little influence on the magnitude of the potential at point 18.

Examples of Values for FIG. 12

Microcontroller 12 COP 842 CJ (National Semiconductor) (FIG. 10 shows, by way of example, the manufacturer's terminal markings 1 through 20 of this microcontroller 12, as well as the port designations used by the Applicant, e.g. OUT1, OUT2, etc.)

| EEPROM 14 | two-wire serial CMOS EEPROM AT24C01A (ATMEL) |
|---|---|
| Resistor 22 | 47 k ohms |
| Resistors 17, 20, 33, 164 | 100 k ohms |
| Resistor 32 | 1 M ohms |
| Resistor 36 | 0.1 ohm |
| Resistor 38 | 1 k ohms |
| Capacitor 42 | 22 nF |
| Comparator 28 | LM2901 |
| Resistor 162 | 1 M ohms |
| Resistor 164 | 100 k ohms |

The mode of operation is the same as described in FIG. 1, but in this embodiment resistor 36 can have a much lower value, since the high-resistance voltage divider 160 causes the adjustable comparison voltages at position input 26 to be substantially reduced (in this example, to values of approximately 0.12, 0.16, or 0.25 V), so that current limiting engages when the voltage u at measurement resistor 36 exceeds the low voltage at positive input 26 established by microcontroller 12.

FIG. 13 supplements the depiction of FIG. 9, i.e. certain features of FIG. 13 are not (or only schematically) depicted in FIG. 9 for lack of space, and conversely certain features of FIG. 9 are not depicted in FIG. 13. FIG. 9 concerns substantially the motor portion, and FIG. 13 the interface 13a for the bus connection as well as the connections of EEPROM 14. Parts that are identical or functionally identical to those in previous Figures are labeled with the same reference characters as therein, and usually are not described again.

EEPROM 14 receives at its data input (SDA) 190 the signal ESDA from port L3 (cf. FIG. 10) of microcontroller 12. Its clock input (SCL) 192 similarly receives the clock signal ESCL from port L4 (FIG. 10) of microcontroller 12. Input 190 is connected via a resistor 196 to Vcc, and input 192 via a resistor 194.

Write-protect input (WP) 198 of EEPROM 14 is connected via a lead CS (=chip select) to port LO (FIG. 10) of microcontroller 12. Only when the signal at LO is high can data be written into EEPROM 14.

If said signal is low, EEPROM 14 is write-protected. Terminals VSS, AD, A1, and A2 of EEPROM 14 are connected to ground 24, and input VCC to voltage Vcc, as depicted.

Lines ESDA and ESCL thus constitute serial bus 15 of EEPROM 14, over which data traffic flows from and to EEPROM 14. Normally, EEPROM 14 (built into the motor) is programmed once at the factory (via serial bus 13), and its terminal 198 then remains at a low potential for the entire operating life of the motor; but in principle, reprogramming of EEPROM 14 is possible at any time if the write protection is cancelled.

FIG. 13 also shows details of bus interface 13a to external bus 13 (FIG. 1). A data line 210 (DATA), which is connected via a resistor 212 to port SI (FIG. 10) of microcontroller 12, leads to interface 13a. From port SI a resistor 214 also leads to Vcc, and a capacitor 216 goes to ground 24. Port SI is also connected to the emitter of a pnp transistor 220, whose collector is connected to ground 24 and whose base is connected via a resistor 222 to port SO (cf. FIG. 10) of microcontroller 12.

Interface 13a furthermore has a clock line (CLOCK) 226 that is connected via a protective resistor 228 to port SK (FIG. 10) of microcontroller 12. The latter is also connected via a resistor 230 to Vcc, and via a capacitor 232 to ground 24.

Bus interface 13a is regularly interrogated in microcontroller 12 to determine whether there is any signal change in it (slave mode); if so, the corresponding procedures are initiated in microcontroller 12, as will be described below with reference to FIGS. 14 through 18.

For serial data transfer, microcontroller 12 that is used in the exemplary embodiment (COP 842 CJ) has a serial interface with a clock line SCL (serial clock), a data input line SI (serial in), and a data output line SO (serial out). This is therefore a three-line system, whereas an I²C bus operates with only two lines, namely line 210 for data (SDA) and line 226 for the clock signal (SCL).

Conversion of the three-line system (SO, SI, and SCL) to the two-line system 210, 226 is provided by pnp transistor 220, which connects data output SO via a collector circuit to line 210 for the data. The pnp transistor 220 is therefore used so that the output signals at port SO are not inverted.

Data input SI is connected directly, via protective resistor 212, to data line 210. Pull-up resistors 214, 230 ensure that a defined voltage level is present at all times on lines 210, 226.

In this fashion, it is possible herein, very advantageously, to implement an I²C bus in slave mode.

Typical Values for FIG. 13

Microcontroller 12 COP 842 CJ (National Semiconductor) (FIG. 10 shows, by way of example, the manufacturer's terminal markings 1 through 20 of this microcontroller 12, as well as the port designations used by the Applicant, e.g. OUT1, OUT2, etc.)

| EEPROM 14 | two-wire serial CMOS EEPROM AT24C01A (ATMEL) |
| --- | --- |
| Transistor 220 | BC856B |
| Resistor 194, 196 | 22 k ohms |
| Resistors 214, 230 | 47 k ohms |
| Resistor 222 | 100 k ohms |
| Resistors 212, 228 | 47 ohms |
| Capacitors 216, 232 | 33 nF |

Mode of Operation of FIG. 13

Data transfer on internal bus 15 takes place in accordance with the protocol of the I²C bus, as described in the reference cited initially, microcontroller 12 being the master and EEPROM 14 the slave. New data can be stored in EEPROM 14 only if the signal on line CS is high. If this signal is low, it is possible only to transfer stored data out of EEPROM 14 to microcontroller 12. This occurs principally during initialization after the motor is switched on, when the necessary data are transferred out of EEPROM 14 into RAM 330 (FIG. 20) in microcontroller 12.

Figure 14:
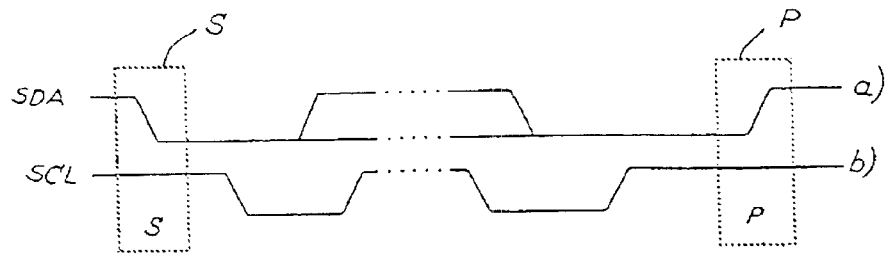
FIG. 14 is a diagram explaining a start condition S and a stop condition P for transfers via the serial bus.

FIG. 14 shows, for the protocol of an I²C bus, the start condition at S and the stop condition at P. The start condition S exists when data line (SDA) 210 changes from high to low while clock line (SCL) 226 is simultaneously high. The communication buffers (buffer memories 332 in FIG. 20) are then erased, and communication is switched to active status. The byte counter is reset. (Communication buffers 332 and the byte counter are located in RAM 330 of microcontroller 12.)

Figure 20:
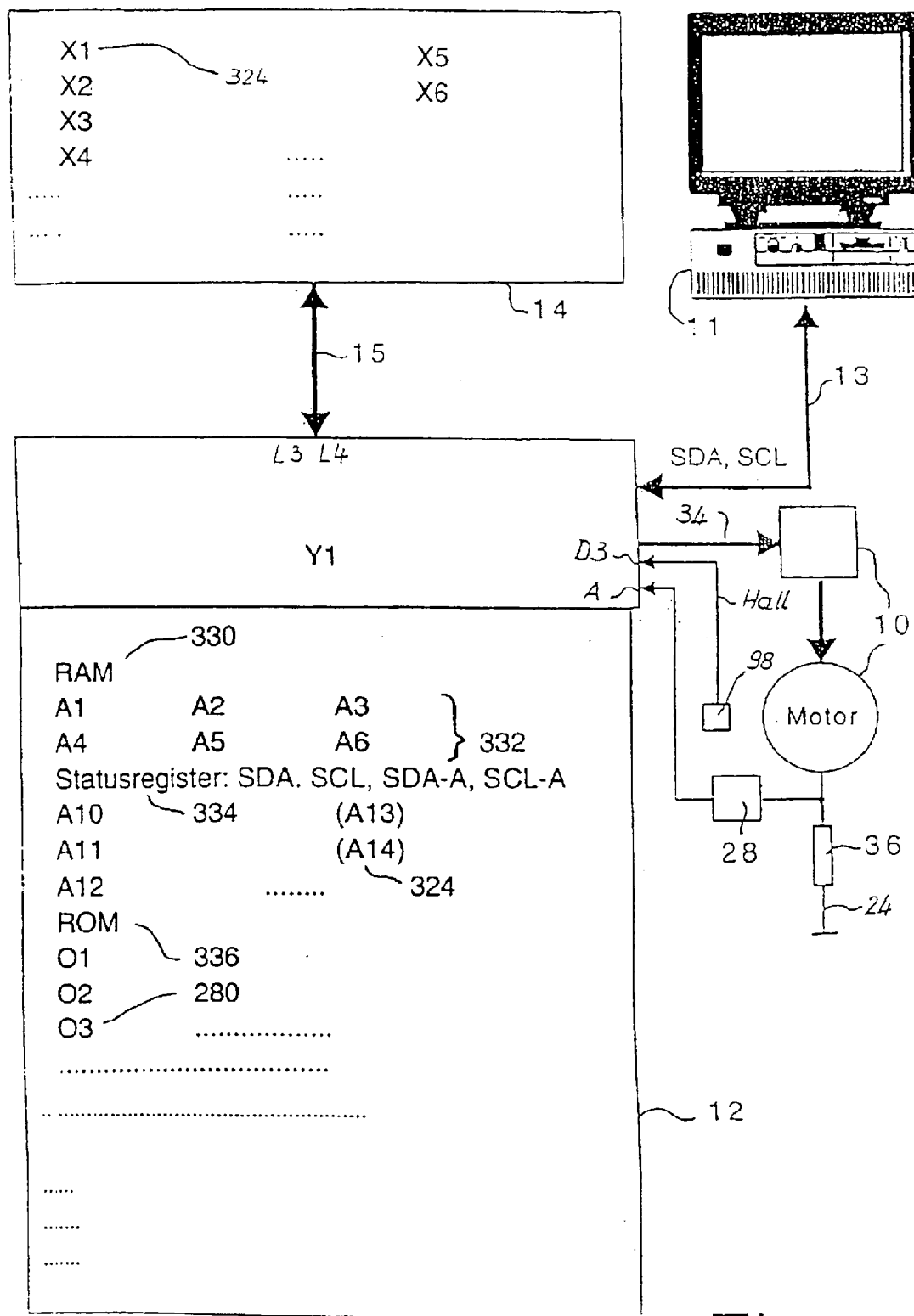
FIG. 20 is a schematic depiction of an arrangement according to the present invention, its various memories, and an exemplary depiction of data that are stored in said memories.

The stop condition P (FIG. 14) exists when data line (SDA) 210 changes from low to high while clock line (SCL) 226 is simultaneously High. In the case of a write access to microcontroller 12, the data are written into the relevant communication buffer 332 (FIG. 20). After the stop condition, the communication status is deactivated. Only now can data be written into RAM 330 or EEPROM 14.

Figure 15:
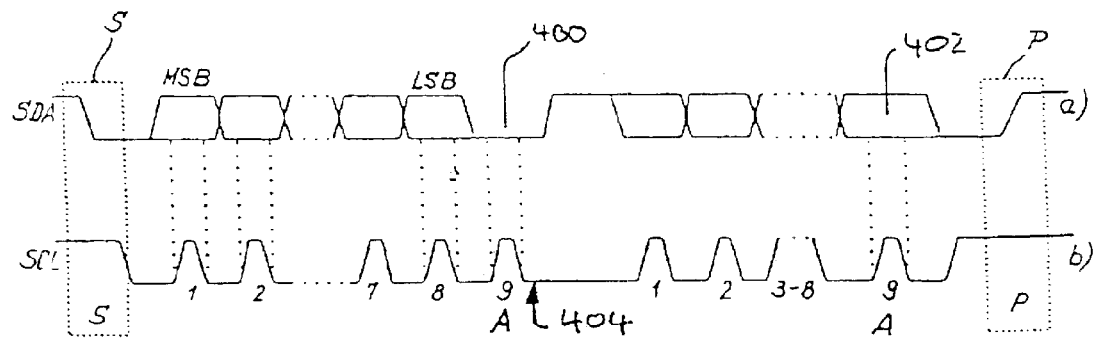
FIG. 15 shows a typical data stream over the serial bus.

FIG. 15 shows the bit stream during a transfer on the I²C bus. The symbols denote:

| MSB = | most significant bit |
| --- | --- |
| LSB = | least significant bit |
| A = | acknowledgment |
| S = | start condition |
| P = | stop condition. |

An acknowledgment from the receiver occurs at 400 and at 402. At 404 the byte has been completely transferred.

Figure 16:
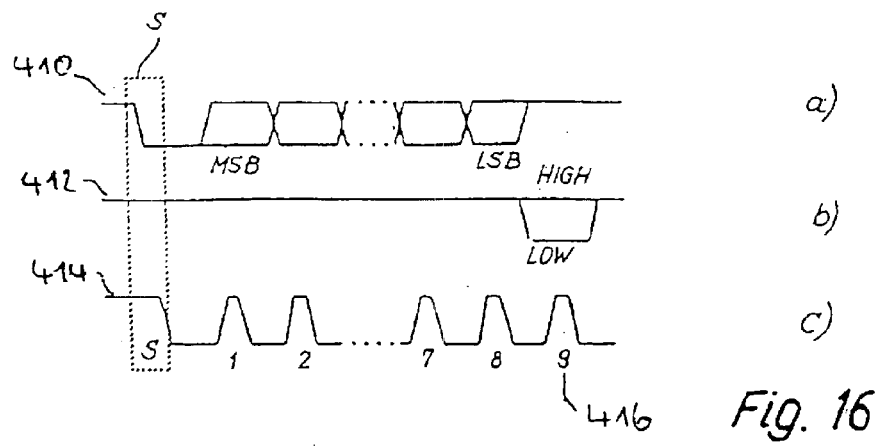
FIG. 16 depicts the bus outputs of the transmitter (FIG. 16a) and receiver (FIG. 16b), and of the clock signal delivered by the master (FIG. 16c)

FIG. 16 shows, at a) the data 410 generated by the transmitter, and at b) the data 412 generated by the receiver. In FIG. 16, HIGH=no acknowledge; and LOW=acknowledge.

FIG. 16c) shows clock signal SCL 414 from the master, the ninth clock pulse 416 being the clock pulse for acknowledgment A.

In the "receive" communication mode, the corresponding data bit is received (i.e. read in) from data line (SDA) 210 after the rising edge on clock line (SCL) 226.

In the "transmit" communication mode, the next bit on data line 210 is output (via transistor 220) after a falling edge on clock line (SCL) 226.

FIG. 17 shows the "write object" communication sequence 420. Here, as in FIG. 18:

S=start condition (cf. FIG. 14)
P=stop condition (cf. FIG. 14)
black areas: from master to slave
white areas: from slave to master
A=acknowledgement (data line SDA 210 low)
A/=no acknowledgment (data line SDA 210 high)

A complete communication, in which one object is sent to the slave, comprises a start condition "S" 240, after which eight bits 242 are received, optionally acknowledged with an acknowledgement signal A 244. These eight bits 242 are made up of seven slave address bits and w one read/write bit 243, which here has a value of 0 (for "write"). If slave address 242 matches the device address (324 in FIG. 20), acknowledgment A is sent, and object address 246 is then received and acknowledged at 247. Object table 280 in FIG. 19 contains (in column 286) a datum regarding the object length associated with object address 246. This indicates how many data blocks (bytes) need to be transferred.

The corresponding number of data blocks 248, 249, and stop condition "P" 250, are then transferred. The data are then received into the particular memory obtained from object table 280 and indicated therein in columns 288, 290 (FIG. 19).

Address 324 of a device (FIG. 20) can be assigned without restriction within a bus system by master 11 (FIG. 20), and is then stored in nonvolatile fashion in EEPROM 14 of the relevant motor 10 or 10'.

FIG. 18 shows the "read object" communication sequence. This sequence is described in more detail below in conjunction with FIG. 20. Parts in FIG. 18 that are identical to FIG. 17 are given the same reference characters as in that Figure.

FIG. 19 shows, by way of example, an object table 280 permanently stored in ROM 336 (FIG. 20) of microcontroller 12, preferably as a hardware component of microcontroller 12.

The meanings of the respective fields are as follows:
AA object address
BB Object name
CC Number of bytes
DD Memory medium
EE Hardware address and the meanings of the fields in column 284 (Object name) are:
B1 Control word init
B2 Status word
B3 Setpoint speed
B4 Actual speed
B32 Manufacturer
B33 Software version Object table 280 contains (in this graphical depiction) a column 282 with object addresses, a column 284 with object names, a column 286 with the length of the object in question (1 or 2 bytes), a column 288 identifying the memory medium (here: RAM, ROM, or EEPROM), and lastly a column 290 with the hardware address.

For example, the software version used in the device has the object address "33", the object name "software version" (field B33), and a length of one byte. It is located in the ROM (336) of microcontroller 12, and has the hardware address "0x01" in ROM 336. The hardware addresses are preferably indicated in the form of a hexadecimal word.

The instantaneous rotation speed derived from the "Hall" signal has the object address "04" and the object name "Actual speed" (field B4); it has a length of two bytes, is located in RAM 330 (of microcontroller 12), and has therein the hardware address "0x01", again in the form of a hexadecimal word.

The general procedure is to store the first object in EEPROM 14 under the address "0x00" therein, the second object under "0x01", etc. The same procedure is used in RAM, i.e. there as well, the first object has the hex address "0x00", the second object "0x01", etc. Object table 280 can begin in ROM 336 at a suitable, defined address.

When the hardware address of an object is read from object table 280, what is read is a hexadecimal word, and along with it the information as to whether that object is stored (or to be stored) in RAM 330, ROM 336, or EEPROM 14. Also evident from object table 280 is the length of the addressed object.

FIG. 20 shows, in highly schematic form, the distribution of various objects to the memories present in the device (fan).

The meanings of the labels used are indicated in the following list:
A1 Buffer A
A2 Buffer B
A3 Buffer C
A4 Buffer D
A5 Buffer E
A6 Buffer F
A10 Status word
A11 Actual speed
A12 $I_{ref}$
A13 Operating hours
A14 Device address
O1 Manufacturer
O2 Software version
O3 Object table
X1 Device address
X2 Setpoint speed
X3 Operating hours
X4 Factory number
X5 Init control word
X6 $I_{ref}$ start
Y1 Processor EEPROM 14 contains the address (X1) 324 of the device, the setpoint speed (X2), operating hour count (X3), factory number (X4), init control word (X5), current limiting value $I_{ref}$ for startup (X6), and additional data.

When motor 10 starts up and at each reset, an initialization occurs, during which various data are transferred via I²C bus 15 from EEPROM 14 into RAM 330 of microcontroller 12: for example, as indicated, the number of operating hours (A13), address 324 of the device (A14), and the current limiting value $I_{ref}$ for startup (A12). These are for the most part the values that the motor needs before starting up. RAM 330 also contains buffer memories (communication memories) 332, for example called buffer A (A1) through buffer E (A6), each of which can store one byte. Also located therein is a status register 334 that contains the present values SDA and SCL (on lines 210 and 226, respectively), as well as the values SDA-A and SCL-A obtained during the previous interrogation.

During operation, lines 210, 226 of I²C bus 13 are continually interrogated, e.g. every 0.5 ms or every 1 ms, to determine whether there are any signal changes on them. Such changes in this case arrive via bus 13 from a computer 11 that functions as master and, for example, regularly performs an interrogation of the actual speed in RAM (330) of microcontroller 12. The number of interrogations per second determines the transfer rate on bus 13, e.g. 1000 Bd. This is based on the needs of the application. If, for example, the device is programmed only once in its lifetime, the transfer rate is immaterial. For an application in a control system, a transfer rate of 1000 Bd is sufficient in most cases, although the number of devices connected to bus 13 of course plays an important role. Data transfer from and to the device takes place via bus 13, i.e. by way of the two lines 210, 226 of FIG. 13.

Figure 21:
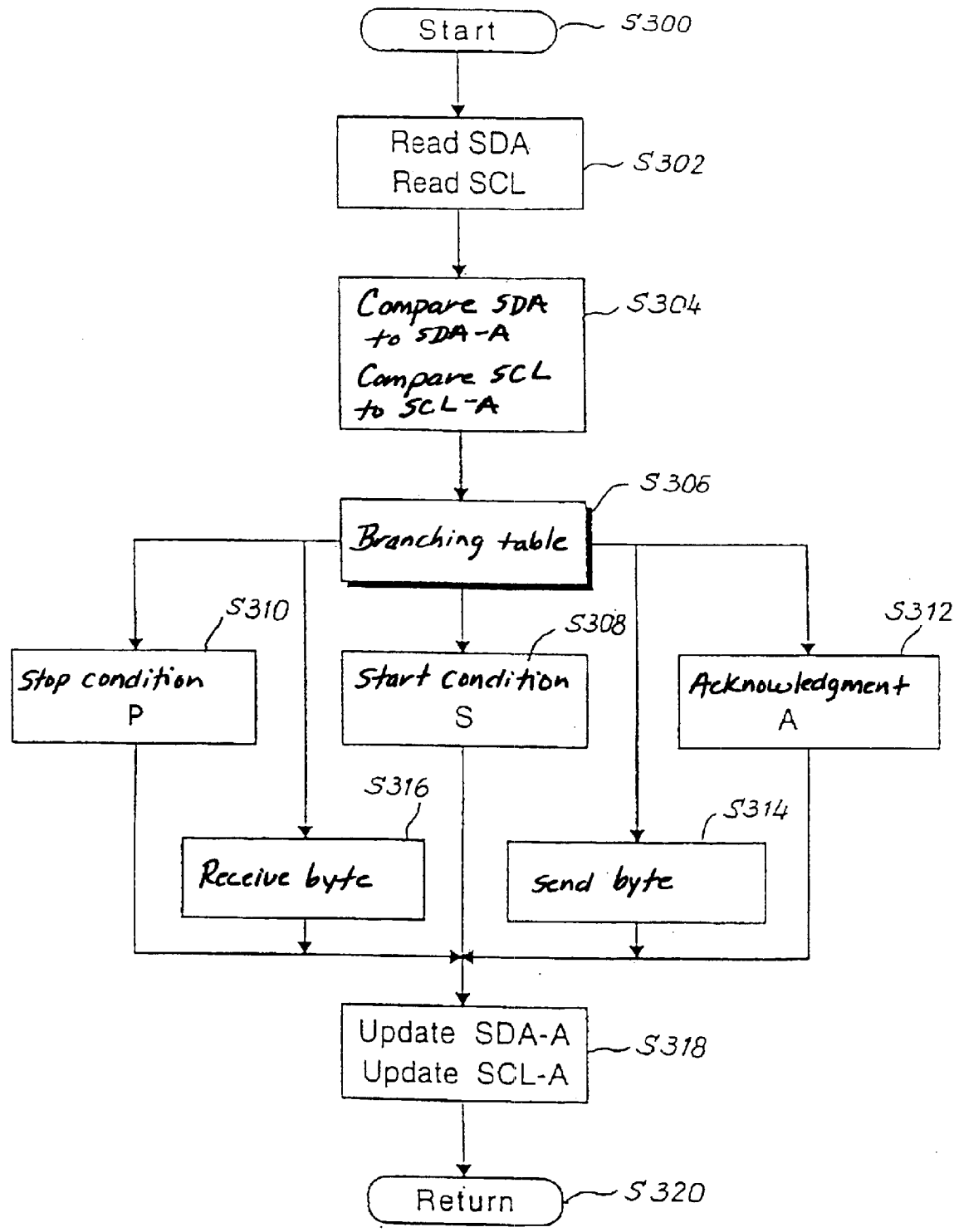
FIG. 21 is a flow chart for interrogating a bus system that connects a subordinate device (slave) to a main device (master)

FIG. 21 shows the procedures for an interrogation of these lines. Step S300 is the start. In step S302, the instantaneous values SDA and SCL on lines 210, 226 are read, and in step S304 are compared to the values SDA-A and SCL-A in status memory 334, which were stored during the previous pass. In step S304, SDA is therefore compared to SDA-A, and SCL to SCL-A.

As FIG. 14 shows, a change in the value SDA from "1" to "0" means a start condition if the value SCL simultaneously retains a value of "1". In step S304 changes of this kind are detected, analyzed, and conveyed to a branching table S306 which, for example when a start condition "S" is detected, proceeds to step S308 which triggers the "start condition" function in the program. Similarly, the program can go from branching table S306 to the stop condition "P" (S310), which is also explained in FIG. 14, or to an acknowledgment "A" (S312) that is explained in FIG. 16b, or to "send byte" in S314 or to "receive byte" in step S316. Steps S310 through S316 trigger the respective corresponding sequences in processor 12, i.e. the corresponding functions are called therein.

The program then goes to step S318, where the values of SDA-A and SCL-A in status register 334 are updated. A return occurs in step S320, i.e. completion of this routine.

The meanings of the labels in FIG. 21 are therefore:

S304 "Compare SDA to SDA-A, compare SCL to SCL-A"
S306 "Branching table"
S308 "Start condition SI"
S310 "Stop condition PI"
S312 "Acknowledgment A"
S314 "Send byte"
S316 "Receive byte"

If, in FIG. 20, PC 11 wishes to inquire as to the actual speed, it then, as shown in FIG. 18, opens communication with start condition 240 (FIG. 18 concerns operation 422, i.e. "read object"). The subsequent first byte 242 contains the address of the addressed device in bits 1 through 7, and a "0" for "write" in bit 8 (least significant bit 243).

Bits 1 through 7, i.e. the address, are compared in microcontroller 12 to address 324 in RAM 330. If bits 1 through 7 in portion 242 match address 324, bit 8 is then checked. If the address does not match, microcontroller 13 disconnects itself from the communication on bus 13. (Other devices with other addresses can be connected to bus 13, for example twenty other devices that operate in parallel with the device depicted in FIG. 20 and can be separately switched on or off, or otherwise controlled, by PC 11 as necessary.)

Once address 242 has been checked and bit 243 (for "write") has been checked, microcontroller 12 sends the acknowledgment signal "A" (244 in FIG. 18). After receiving signal 244, PC 11 sends object address 246, in this case e.g. (as shown in FIG. 19) object address "104" (actual speed), this being the address of the object that PC 11 wishes to read next. Following the acknowledgment signal "A" 247 (from microcontroller 12), PC 11 sends a stop condition "P" that is labeled 250 in FIG. 18.

Based on object address 246, a determination is then made from object table 280 that the object, in this case e.g. the actual speed, comprises two bytes; in microcontroller 12, the two bytes of the actual speed are then transferred into the corresponding buffer memories 332 so they are ready there for a subsequent transfer.

PC 11 then sends (as shown in FIG. 18) another start condition 252, and the first byte 254 with the same device address as in byte 242, but with a value of "1" (for "read") in bit 8 that is labeled 256. Once the address and bit 8 have been checked, PC 11 waits for the transfer of data blocks 258, 262 from the corresponding buffers in buffer memories 332, and they are transferred successively via I²C bus 13 to PC 11. After byte 258, the latter sends an acknowledgment "A" that is labeled 260 in FIG. 18 and is checked by microcontroller 12. After the last byte 262, it sends (at 263) no acknowledgment ("A/"). When PC 11 has received both data bytes 258 and 262, it sends the stop condition "P" 264. This means that the number of transferred data bytes 258, 262 has been checked and is correct.

Writing to EEPROM 14

This is procedure 420 in FIG. 17, namely "write object". PC 11, which constitutes the master, opens communication with the start condition "S" 240 (cf. FIG. 17). The next byte 242 contains the device address in its bits 1 through 7, and contains in the least significant bit 243 (bit 8) a datum as to whether a read or a write operation is to follow. In this case bit 8 is a zero, i.e. computer 11 wishes to write data, for example into RAM 330 or EEPROM 14. The location to which writing is to occur is determined from object address 246 and object table 280.

First the address in bits 1 through 7 is compared to device address 324 in RAM 330 of microcontroller 12. If these seven transferred bits do not match device address 324, the device disconnects itself from communication. If the address does match, bit 8 is checked. Microcontroller 12 then sends an acknowledgment signal "A" 244.

PC 11 then sends the next byte 246, namely the object address. Based on this address, information is retrieved from object table 280 regarding the object that is to be transferred next. If the object is, for example, the setpoint speed (table value B3 in column 284, "Object name"), it is apparent from the object address "03" that the setpoint speed contains two bytes and is stored in EEPROM 14 under the address "0x01". This therefore means that two bytes need to be transferred; and if, for example, more or fewer than two bytes were transferred, this means an error has occurred. After byte 246 is received, there is another acknowledgment signal "A" that is labeled 247. Data bytes 248, 249 of that object are then transferred from PC 11 into the associated buffers 332 in RAM 330, an acknowledgment signal "A" being sent by microcontroller 12 after each byte.

Once PC 11 has transferred all the bytes and obtained an acknowledgment signal "A" each time, it sends the stop condition "P" 250. A check is then made in microcontroller 12 to determine whether the expected number of bytes has been transferred. If this number does not match, the data are discarded. If the number matches, the data are written into EEPROM 14 at the identified address "0x01", by calling the transfer routine of I²C bus 15 to the EEPROM. This routine first needs the address ("0x01") into which the data are to be stored in EEPROM 14. The routine then transfers the data that were stored, upon reception from PC 11, in data buffers 332 in RAM 330. The routine sends the data from buffer 332 with data byte 248, and then from buffer 332 with data byte 249, to EEPROM 14. Based on the number of bytes in the object, which was determined from column 286 of object table 280, the routine knows which buffers 332, and how many of them, need to be read out and transferred.

After the transfer into EEPROM 14, the transferred data can optionally be read back again in order to make a comparison with the transmitted data and thereby check for a correct transfer.

Outputting Data from EEPROM 14

This transfer also takes place via buffer memories 332 in RAM 330 of microcontroller 12, i.e. a first instruction (FIG. 18, above) of PC 11 (master) causes the data to be transferred out of EEPROM 14 into the relevant buffer memories 332, and a second instruction (FIG. 18, below) causes these data to be transferred out of the relevant buffer memories 332 to PC 11.

This transfer is thus initiated by PC 11, which functions as master. After the start condition "S" 240, it sends the first byte 242 with the device address, and bit 243 which in this case contains a zero, i.e. denoting a write instruction. Once the address in byte 242 has been successfully checked, bit 243 is checked. Microcontroller 12 then sends (at 244) an acknowledgment signal "A". PC 11 thereupon transfers, in byte 246, the object address of the object that it then wishes to read out. The transfer is acknowledged by microcontroller 12 with an acknowledgment signal "A" 247, and PC 11 then sends, at 250, a stop condition "P".

The object in question, how long it is, and where it is stored are determined from object table 280 (FIG. 19) by way of the object address (byte 246). If the object address is, for example, "03", the object is then B3 "setpoint speed" with a length of two bytes, and it is stored in the EEPROM at the address "0×01". With the help of these data, that object, i.e. in this case the setpoint speed, is transferred from EEPROM 14 into the corresponding buffers 332 of RAM 330.

PC 11 then once again sends a start condition "S" at 252, and then at 254 sends the first byte with the device address and bit 256, which in this case has a value of "1" corresponding to a read operation. Once again, the device address (in byte 254) is compared to address 324 in RAM 330, and if they match, bit 256 is checked. Once the check is successfully completed, microcontroller 12 sends (at 257) an acknowledgment signal "A". It then transmits the data out of buffer memories 332 in RAM 330. First comes the first byte 258 that is acknowledged (at 260) by PC 11 with an acknowledgment signal "A". Then comes the second and last byte 262, for which no acknowledgment ("A/" at 263) is made prior to the subsequent stop condition 264. Since in this case the transferred object contains two bytes 258, 262, the stop condition "P" is sent by PC 11 at 264 because PC 11 has received two bytes.

During operation, the motor therefore operates with the data that were stored in RAM 330 of microcontroller 12 at initialization. After a reset, for example as a result of electromagnetic interference, these data are lost. For that reason, RAM region 330 is reinitialized at each reset and after the device has started up, i.e. the data that are to be used for operation are loaded from EEPROM 14 via bus 15 into RAM region 330 of microcontroller 12.

During operation, as just explained, data can be read out from EEPROM 14 or conversely written into EEPROM 14. There also exists the possibility of reading out data from RAM 330, i.e. for example the actual speed (object A11 in FIG. 20) or from ROM 336 (e.g. the manufacturer, object O1 in FIG. 20), or writing such data into RAM 330, e.g. the desired setpoint speed as defined by master 11. The location to which the data are written or from which they are retrieved (RAM 330, ROM 336, or EEPROM 14, and the address therein) is ascertained from object table 280, which is permanently stored in the device. The use of this object table thus eliminates the need to transfer detailed address data in a write or read instruction, i.e. a kind of indirect addressing is used here, since all the essential data for the objects are stored in object table 280, preferably in the form of a permanent memory (ROM).

Because buffer memories 332 are interposed, the result in each instance is that when data are read, they are read out from said buffer memories 332, and when data are written, they are written first into said buffer memories 332, so that corresponding address indications can be omitted from the instructions. The overall result is that the instructions are of simple configuration and are rapidly executed, so that it is possible to work with a simple, economical microcontroller that can additionally handle other tasks such as:

A/D conversion, current limiting, speed regulation, controlling commutation of motor 10' (FIG. 11), and others.

If the quantity of data that needs to be transferred over bus 13 or 15 during a transfer is greater than the number of buffer memories 332, the transfer is divided into a plurality of transfers, i.e. into packets.

FIG. 22 shows the manner in which an equipment fan 340 is connected via its interface 13a and serial bus 13 for programming on a laptop 11. In this fashion, the data in EEPROM 14 of fan 340 can be adapted to specific conditions. Fan 340 is then disconnected from bus 13 and operated as an independent unit, since the data that were input remain stored in EEPROM 14. Operating hours are continuously counted in EEPROM 14, and can be read out by once again connecting laptop 11.

FIG. 23 shows a "battery" of fans with three equipment fans 340A, 340B, 340C, each of which has its own EEPROM 14A, 14B, 14C that (in the fan) is connected in each case via a serial bus 15 to the microcontroller therein.

All three fans are connected via bus 13 to a central unit 11, e.g. PC. Stored in EEPROM 14 is, for example, the address A of fan 340A, also the value $I_{ref}$ for current limitation at startup, and the time $T_{SA}$ (cf. FIG. 5, step S52), i.e. the time $T_S$ for fan 340A.

EEPROMs 14B and 14C analogously contain the (device) addresses B and C of fans 340B and 340C, respectively. They also contain the associated values $I_{ref}$ for current limitation for the particular fan, and times $T_{SB}$ and $T_{SC}$. This makes it possible to stagger the starting times for the three fans, i.e. fan 340A is started, for example, at maximum current, fan 340B at medium current, and fan 340C at low current, so as not to overload a central power supply (not shown) for all three fans during startup. Alternatively, the fans can be switched on at staggered times in the same fashion.

Because central unit 11 continuously monitors the rotation speeds of all three fans, it is possible to detect if, for example, fan 340B is jammed; central unit 11 can then, via bus 13, correspondingly increase the speeds of fans 340A and 340C to compensate for this failure. For that purpose, in such a case a higher setpoint speed for fans 340A, 340C is defined via bus 13, as already described above in detail.

At low temperatures, central unit 11 can switch off one or more of the fans via bus 13.

The depiction in FIG. 24 is similar to that of FIG. 23. Since bus 13, in the very simple and economical design described, needs to be only relatively short (e.g. a maximum of 4 meters long), central unit 11 can be connected via a higher-performance bus 346 to a server 344. As indicated, this can be, for example, a CAN bus or a LON bus or an Interbus-S. Communication is also possible, by way of any desired bus 348, with a central unit 11A that optionally controls further fans, and via a bus 350 with a central unit 11B that also can control additional fans or other devices. The EEPROMs of the three fans 340A, 340B, 340C of FIG. 24 can be identical to those of FIG. 23, and are therefore not depicted again in FIG. 24.

The invention is of course not limited to being applied to fans, but this is a very advantageous field of application since with fans there are numerous variables that need to be adjusted depending on the particular application.

It must be pointed out once again that there are many different bus systems, and that the serial bus described therefore represents only one preferred embodiment of the invention. In other respects as well, many variants and modifications are possible within the scope of the present invention.

What is claimed is:

1. A method of controlling the startup of an electric motor comprising an associated control circuit including a microprocessor (12), a nonvolatile memory (14), a data bus (13, 15) interconnecting said microprocessor and memory, and an arrangement, coupled to an output of said microprocessor, for limiting the motor current (i), the method comprising the following steps:

storing, in the nonvolatile memory, a startup time (Ts) via the data bus (13, 15);

switching on the motor and thereafter monitoring the start up time (Ts) of said motor;

during said startup time (Ts), setting, under control of a program running in said microprocessor, a current limiting value (Iref), of the arrangement for limiting the motor current (i), to a first value (Iref=1);

ascertaining expiration of said startup time (Ts) and thereafter, in a program-controlled manner, setting the current limiting value (Iref) to a second value (Iref= TST) that is different from said first value.

2. The method as defined in claim 1, wherein the second current limiting value is less than the first current limiting value.

3. The method as defined in claim 1, further comprising upon expiration of the startup time (Ts), determining whether motor current limiting has been effective during a time span that exceeds a predefined time span; and if such current limiting has been effective during said time span, changing the current limiting value (Iref) in program-controlled fashion to a third value (Iref=0).

4. An arrangement comprising an electric motor (10; 10'), adapted for driving a fan (73), a microprocessor (12), for influencing at least one motor function, there being associated with that microprocessor (12) a volatile memory element (330) and a nonvolatile memory element (14), said memory elements being configured for storing at least one object, including data and attribute, as a definition for that motor function;

an interface (13a), associated with the electric motor, for a data line (13; 210, 226) for transferring that at least one object between said microprocessor and a memory element (14, 330), and a stored directory (280), associated with the microprocessor (12), which contains, for objects that are transferable via the data line (13, 210, 226), predefined parameters (286, 288, 290) for the transfer of those objects.

5. The arrangement as defined in claim 4, wherein the stored directory (280) contains data (286) as to the length of transferable objects.

6. The arrangement as defined in claim 5, wherein the stored directory (280) contains data (286) as to whether the relevant object is intended for storage in the nonvolatile memory (14) or in a volatile memory element (330).

7. The arrangement as defined in claim 4, wherein the stored directory (280) contains data (290) as to the address of the object in a memory element (14, 330).

8. The arrangement as defined in claim 4, wherein the stored directory (280) is stored in a nonvolatile and permanent fashion in a memory (336) associated with the microprocessor (12).

9. The arrangement as defined in claim 8, wherein the stored directory (280) is a hardware component of the microprocessor (12).

10. The arrangement as defined in claim 4, wherein the microprocessor (12) is connected to the interface (13a) for the data line (13); and the transfer of objects from and/or to the nonvolatile memory element (14) is accomplished via the microprocessor (12).

11. The arrangement as defined in claim 4, wherein the data line is a serial data bus (213, 210, 226).

12. The arrangement as defined in claim 4, wherein at least one buffer memory (332) for data traffic with a data line (13; 15) is provided in the volatile memory associated with the microprocessor (12).

13. The arrangement as defined in claim 4, wherein the nonvolatile memory element (14) is connected to the microprocessor (12) via a line (CS) which, controlled by the microprocessor (12) influences a write protection of the nonvolatile memory element (14).

14. A fan system, comprising a fan including an electric motor (10) whose speed is dependent on a commutation signal supplied thereto;

a writable memory (14) integral with the fan and containing fan control information;

a microcontroller integral with, and which outputs a commutation signal to, the electric motor of said fan, in accordance with control information stored in the writeable memory (14);

a host computer (11); and an interface (13) between the host computer (11) and the microcontroller (12);

the host computer providing different control information to the memory (14) via the interface (13) when said microcontroller (12) outputs different commutation signals in accordance with the control information currently stored in the memory (14) and supplied thereto by the host computer (11).

15. The fan system of claim 14, further including a temperature sensor linked to the host computer.

16. The fan system of claim 14, in which the control information provided to the memory is rpm data.

17. The fan system of claim 14, in which the control information provided to the memory is startup current information.

18. The fan system of claim 14, in which the interface (13) is a serial interface.

19. The fan system of claim 14, in which the microcontroller (12) controls the commutation of said electric motor (10) and the transfer of fan control information between said writeable memory (14) and said host computer (11), whereby said host computer is capable of being dynamically and continuously interfaced with the fan.

* * * * *

UNITED STATES PATENT AND TRADEMARK OFFICE
CERTIFICATE OF CORRECTION

PATENT NO.         : 6,825,625 B1                                    Page 1 of 1
APPLICATION NO.    : 09/719440
DATED              : November 30, 2004
INVENTOR(S)        : Karwath et al.

It is certified that error appears in the above-identified patent and that said Letters Patent is hereby corrected as shown below:

On Title page 2, Item [56] U.S. Patent Documents, column 1, add reference
-- 6,163,117 A 12/2000 Rappenecker et al. --
In column 1, line 11 delete "of the Applicant"
In column 1, line 38 delete "the subject matter of claim 1"
In column 1, lines 47 & 48 delete "the subject matter of claim 11"
In column 11, line 20 delete "w"
In column 13, line 45 "SI" should be -- S --
In column 13, line 46 "PI" should be -- P --
In column 14, line 3 "104" should be -- 04 --
In column 16, line 42, after "e.g." insert -- a --

Signed and Sealed this

Ninth Day of September, 2008

JON W. DUDAS
*Director of the United States Patent and Trademark Office*